United States Patent
Gruhl et al.

(10) Patent No.: US 6,717,569 B1
(45) Date of Patent: Apr. 6, 2004

(54) CONTROL DEVICE WITH ENHANCED CONTROL ASPECTS AND METHOD FOR PROGRAMMING SAME

(75) Inventors: Robert E. Gruhl, Seattle, WA (US);
Thomas W. Brooks, Seattle, WA (US);
Melissa S. Jacobson, Seattle, WA (US);
Allen M. Han, Kirkland, WA (US);
Drew C. Bamford, Seattle, WA (US);
Damon V. Danieli, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/515,370

(22) Filed: Feb. 29, 2000

(51) Int. Cl.[7] ................................ G09G 5/08
(52) U.S. Cl. ................ 345/157; 345/172; 463/37
(58) Field of Search ............... 345/156, 157, 345/158, 159, 160, 161, 162, 163, 167, 168, 169, 172, 732; 74/471 XY; 273/148 B; 463/36, 37, 38; 331/1 M

(56) References Cited

U.S. PATENT DOCUMENTS

| | | | |
|---|---|---|---|
| 3,784,749 A | | 1/1974 | Hess |
| 4,659,313 A | * | 4/1987 | Kuster et al. ............... 345/156 |
| 5,142,931 A | | 9/1992 | Menahem |
| 5,229,742 A | | 7/1993 | Miyamoto et al. |
| 5,565,891 A | * | 10/1996 | Armstrong ................. 345/167 |
| 5,675,359 A | | 10/1997 | Anderson |
| 5,854,622 A | | 12/1998 | Brannon |
| 5,877,765 A | | 3/1999 | Dickman et al. |
| 5,880,714 A | | 3/1999 | Rosenberg et al. |
| 5,914,714 A | | 6/1999 | Brown |
| 5,949,325 A | | 9/1999 | Devolpi |
| 5,959,556 A | | 9/1999 | Shrader et al. |
| 6,002,351 A | | 12/1999 | Takeda et al. |
| 6,213,880 B1 | * | 4/2001 | Sim ............................ 463/37 |
| 6,256,011 B1 | * | 7/2001 | Culver ...................... 345/157 |
| 6,282,798 B1 | * | 9/2001 | Yeh et al. .................... 33/1 M |
| 6,317,141 B1 | * | 11/2001 | Pavley et al. ............... 345/732 |
| 6,323,844 B1 | * | 11/2001 | Yeh et al. ................... 345/166 |
| 6,326,948 B1 | * | 12/2001 | Kobachi et al. ............ 345/157 |

OTHER PUBLICATIONS

Logitech CyberMan 2 Digital Game Controller User's Manual (pp. 1–8, English section), Logitech Inc., 1997.
Logitech CyberMan, The Logitech "Cyberman", picture from http://www.ideo.com/studies/logicyb.htm, (date unknown, but prior to filing of application).

* cited by examiner

Primary Examiner—Xiao Wu
(74) Attorney, Agent, or Firm—Banner & Witcoff, Ltd.

(57) ABSTRACT

A control device that combines a movable pod, that is sized to comfortably support a user's hand, with control buttons that are easily commanded by the user's fingers and thumb without interfering with pod movement, thereby allowing the user to quickly, simultaneously, and intuitively, command multiple aspects of a user application software, such as a game. Preferably, the pod is movable simultaneously in three different directions: forward-and-backward, side-to-side; and axially about an axis. The device also uses the distance the pod is displaced from a neutral position as an additional control parameter for commanding the application software. In addition, control commands associated with the control buttons and movement of the pod may be programmed by the user either "on the fly" or by using a graphical user interface. Also, the device provides feedback to the user regarding the programmed status of each button and available pod movement.

25 Claims, 13 Drawing Sheets

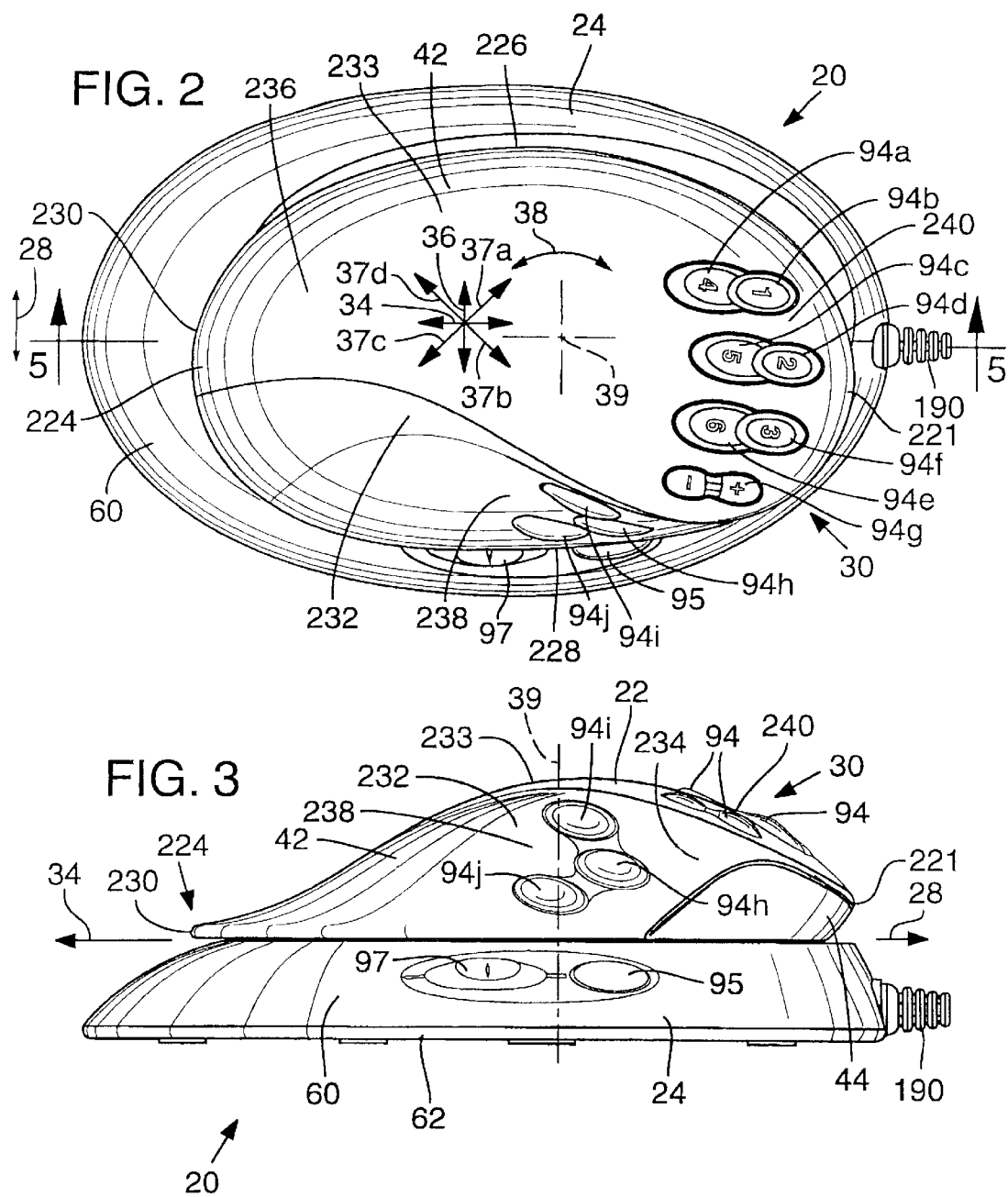

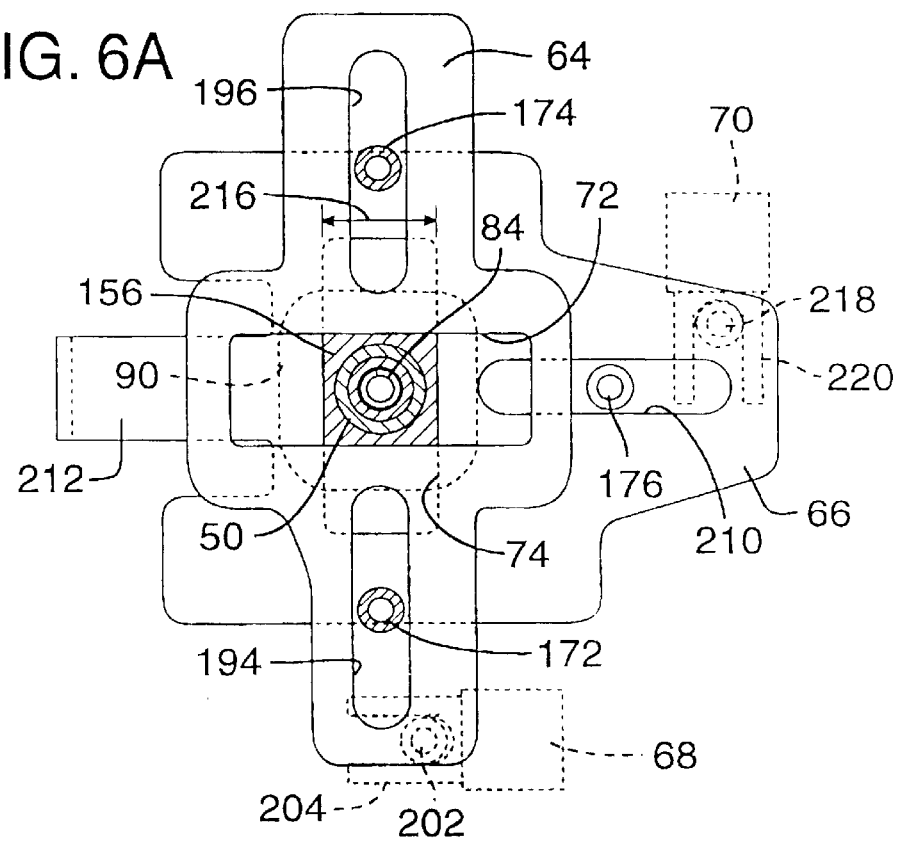
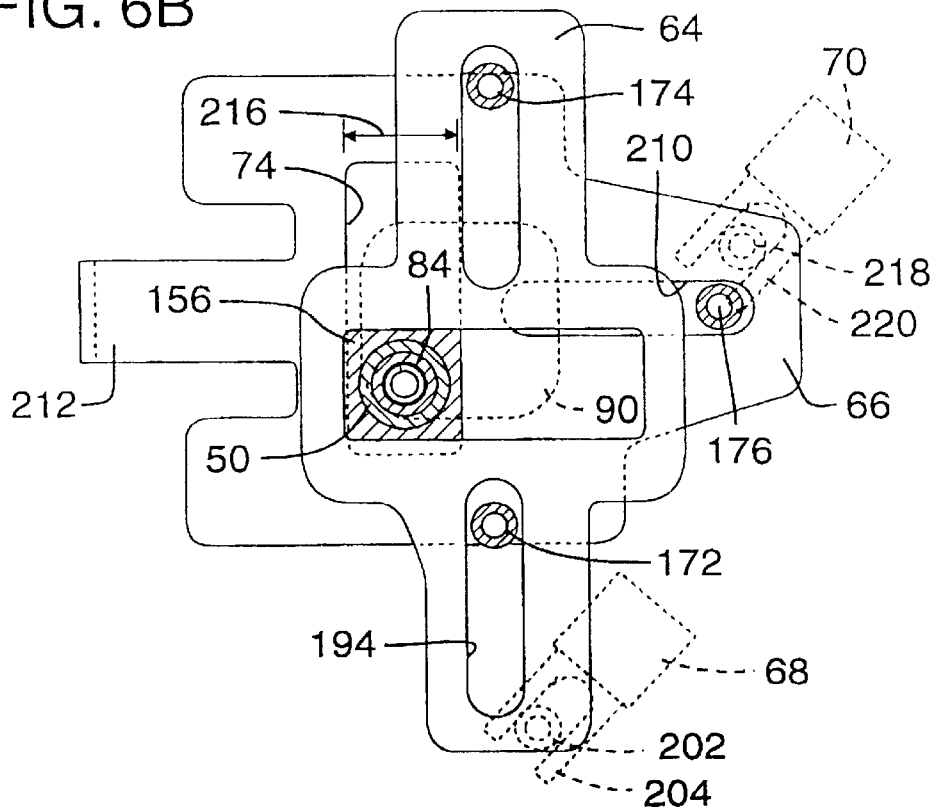

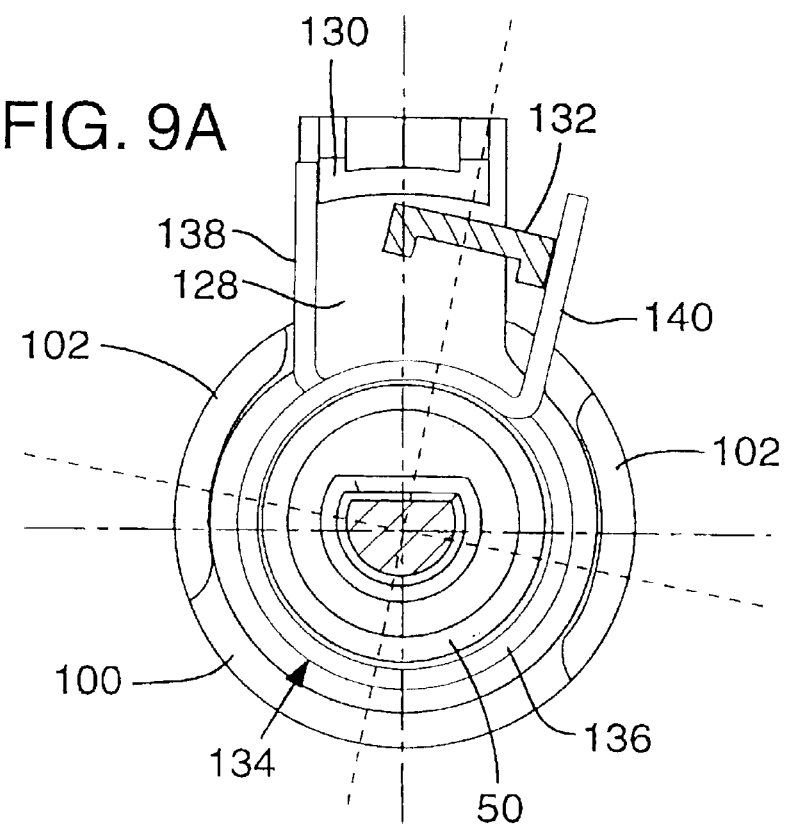
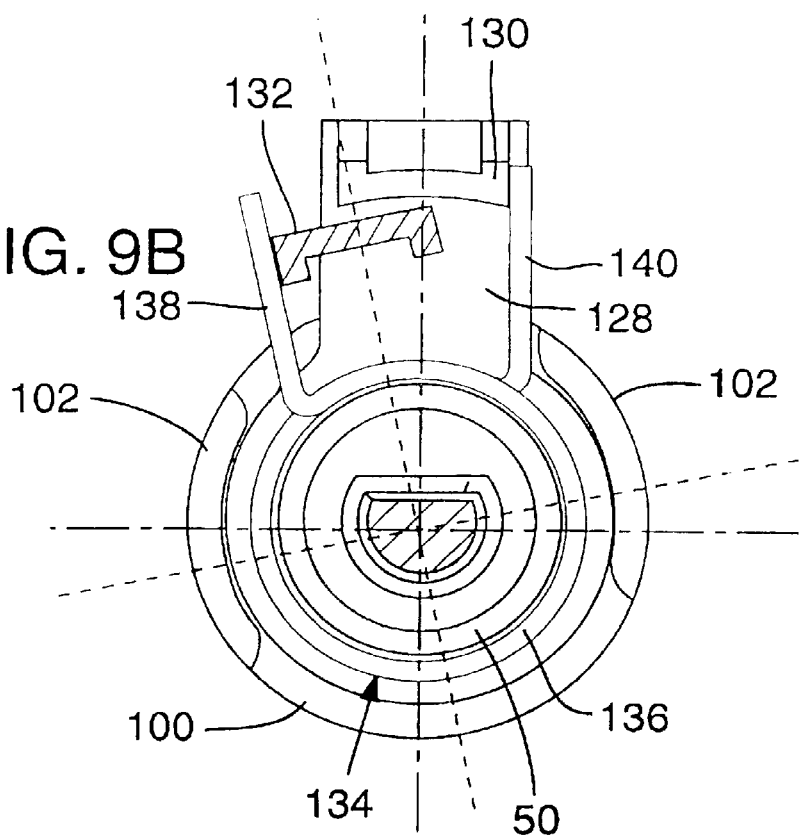

CONTROL DEVICE WITH ENHANCED CONTROL ASPECTS AND METHOD FOR PROGRAMMING SAME

TECHNICAL FIELD

This invention relates to a control device, preferably used to input information into a computer and the like, that has enhanced control aspects, and a method for programming that controller. The control device combines a movable pod, that is sized to comfortably support a user's hand, with control buttons that are easily commanded by the user's fingers and thumb without interfering with pod movement, thereby allowing the user to quickly, simultaneously, and intuitively, command several different aspects of a user application software, such as a game.

In particular, the pod is movable simultaneously in three different directions: forward-and-backward, side-to-side; and axially about an axis. The device also uses the distance the pod is displaced from a neutral position as an additional control parameter for commanding the application software. In addition, control commands associated with the control buttons and movement of the pod may be programmed by the user either "on the fly" or by using a graphical user interface. Also, the device provides feedback to the user regarding the programmed status of each button and available pod movement.

BACKGROUND OF THE INVENTION

Control devices such as mice and joysticks are widely known and used, particularly in computer applications. They allow users to quickly command the application software without the need to key-in information through a keyboard. For example, a mouse permits its user to quickly position a computer's cursor at a desired location on the computer screen simply by moving the mouse around a flat surface. Moreover, the hand movements required to move a computer mouse are easy to learn, intuitive, and can be done over extended periods of time with minimal fatigue. Similarly, tilting-type joysticks, including both base and hand supported models, are frequently used to command computer application software such as video games. Joysticks permit a user to command various aspects of the computer program or game, such as commanded speed, direction, or view, by physically tilting the joystick lever about its tilt axis.

These types of control devices typically include one or more buttons that may be depressed by the user to send additional command information to the computer. For example, double depressing or "clicking" the left button on a mouse typically sends a command to the application software to execute a cursor-highlighted function.

Despite the benefits associated with typical mouse and joystick control devices and their control buttons, they have several limitations that compromise their desirability in certain types of applications. For example, gaming software has evolved into providing a player with highly sophisticated three-dimensional gaming environments, featuring numerous independently operable players, characters, weapons, tools, views, situations, and the like, all of which may be moved and controlled, often simultaneously by commands entered by the user. The typical method for entering these commands includes using a keyboard and mouse or joystick, which often is time consuming, and distracts the user from playing the game.

In particular, using a mouse and keyboard to play these games, the user types in commands on the keyboard and manipulates the mouse or joystick to view the gaming area. For example, most real time strategy games allow "camera" movement within their game worlds. One such game is "POPULOUS: THE BEGINNING," a real-time strategy game published by The Electronic Arts Company, which provides four degrees of freedom of its "camera" view. In particular, this game allows users to move the "camera" view up, down, left, right, rotate right, rotate left, zoom in, and zoom out. Camera movement is accomplished either through moving the mouse to the edges of the screen or by pressing keyboard keys.

However, using either a mouse or keyboard to change the camera view interferes with the users' gaming experience. While executing camera movement using the mouse, the user cannot direct game action with the mouse. Namely, the user has difficulty changing the view of the game through the camera controls while still manipulating the context of the game. While executing camera movement using the keyboard, the user cannot direct game actions with keyboard shortcuts, and instead must use slower mouse movement.

Moreover, it is difficult to achieve smooth camera control in such games using a keyboard. For example, in "POPULOUS: THE BEGINNING," camera control is obtained by the user actuating the following keyboard keys during the game:

| Keyboard Key | Camera Command |
| --- | --- |
| Delete | Scroll Left |
| Page Down | Scroll Right |
| Arrow Up | Scroll Forward |
| Arrow Down | Scroll Backward |
| Arrow Left | Scroll Left |
| Arrow Right | Scroll Right |
| +/= key | Zoom In |
| _/− key | Zoom Out |

In order for a user to obtain the desired "camera" view, they must essentially stop playing the game and enter the desired combination of keyboard keys. This compromises the user's gaming experience.

Moreover, many games require the user to perform selected keyboard entry tasks repeatedly, either throughout the game, or at the beginning of each new game.

For example, in order to place a user in a desirable configuration at the start of the real-time strategy game published by Microsoft Corporation under the trademark "AGE OF EMPIRES," and more specifically "AGE OF EMPIRES II THE AGE OF KINGS," it is desirable for the user to enter the following sequence of commands:

| Keyboard Key | Associated Command |
| --- | --- |
| h | Go to town center |
| c | Build villager |
| c | Build villager |
| c | Build villager |
| c | Build villager |
| <F4> | Display opponent summary information |
| <F11> | Display elapsed time and population information |
| . | Select first idle villager |
| b | Build |
| e | House |

This sequence of commands must typically be repeated every time a new game is started. Accordingly, a user is forced to repeat this sequence with each new game, distracting and delaying the user from playing the game. Similarly, other routine series of commands must be repeatedly keyed-in while playing the game, further distracting and interfering with the user's gaming experience.

The keystroke repetition and time delay associated with using a typical keyboard and mouse or joystick controller is caused primarily by the following two limitations with these types of controllers: First, the control buttons of typical mouse and joystick controllers provide only limited commands. And second, the overall amount of command information that can be collected and transmitted by physical manipulation or movement of these typical controllers is limited.

A primary limitation with typical mouse and joystick controllers is that the x and y coordinate information they collect by manipulation of the mouse or joystick is limited to providing only corresponding x and y pointing command information to the application software. For example, if a traditional mouse is moved from one point to another, the total distance the mouse is displaced between the two points is not used as a control command by the user application software. Similarly, while the rotation of some traditional joysticks may send corresponding movement information to the application software, usually as rotational direction control, the physical distance the joystick is deflected from its neutral position triggers no additional control commands.

Control designers have attempted to address the problem of limited control information associated with physical movement of typical control devices by increasing the degrees of freedom of movement of the controllers. For example, see U.S. Pat. No. 5,880,714 to Rosenberg et al ("Rosenberg et al."). and U.S. Pat. No. 5,854,622 to Brannon ("Brannon"). However, these devices require their users to manipulate complex articulated three dimensional linkages (Rosenberg et al.) or move a lever secured by multiple rods about a three dimensional space (Brannon). They do not use information already collected by the controllers, such as basic x and y coordinates, to add an additional control parameter. Accordingly, these devices are complex, expensive to manufacture and service, fatiguing and counter-intuitive to use.

Moreover, it is desirable for movable controllers to be biased to a neutral position and for the forces acting on the controller to return it to its neutral position to be relatively small, be felt by a user holding the controller as being directed towards the controller's neutral position, and be roughly proportional to the distance the controller is displaced from its neutral position in all directions. In such incidences, the amount and direction of return force felt by the user serves to indicate the direction and the amount of deflection of the controller, thereby improving the controller's "feel" and accuracy, and providing an additional level of control.

The typical mouse is not biased to a neutral position. Also, known devices for returning conventional joysticks to a neutral position compromise the smooth operation of the controller throughout its range of motion. In particular, the forces acting on the controller to return it to its neutral position are applied unevenly throughout the range of motion of the joystick, and they are not proportional to the distance the controller is displaced from its neutral position.

The control buttons on typical mice and joysticks offer only limited command instructions. They cannot be easily programmed by the user to perform any or all commands for a given software application. Similarly, these control buttons only send information to the application software, they do not typically receive feedback from the application software. Accordingly, the user of that button has no way of knowing if the button has been programmed correctly for a particular application until after the button is pressed and its preprogrammed command has been activated. Testing control buttons in this manner can adversely affect the outcome of a game.

Thus, despite the benefits of known controllers, there remains a need for a controller that is movable in several directions, and provides easily accessible control buttons that may be commanded by the user without interfering with movement of the controller or requiring extensive training to learn how to use. There also remains a need for a user to be able to quickly and easily program the control buttons and pod movement with control commands, and for the programmed status of those control buttons and pod movement to be easily verified by the user.

In addition to other benefits that will become apparent in the following disclosure, the present invention fulfills these needs.

SUMMARY OF THE INVENTION

The present invention is a control device having a movable pod, that is sized to comfortably support a user's hand, with control buttons that are easily commanded by the user's fingers and thumb without interfering with pod movement, thereby allowing the user to quickly, simultaneously, and intuitively, command several different aspects of a user application software, such as a game.

The pod is movable simultaneously in three different directions along a plane: forward-and-backward, side-to-side; and axially about an axis. Preferably, it is sized to support a user's hand, and has a smoothly contoured surface with a palm engaging portion, a thumb-engaging portion, and a finger-engaging portion. Some of the control buttons are positioned on the finger-engaging portion such that they may be activated without the user lifting his or her hand from the pod. Other control buttons are positioned on the thumb-engaging portion and may be activated by the user's thumb without the user lifting his or her hand from the pod. As a result, a user can manipulate the control buttons while moving the pod throughout its entire range of motion, thereby providing simultaneous control commands to the application software.

Each direction of movement may be programmed by the user to activate different control commands. Similarly, combinations of these movements, such as movement in a direction that is diagonal to the forward-to-backward and side-to-side movements of the pod can be programmed with control commands. Alternatively, such commands may be imbedded in the user application software.

The control device can also use the distance the pod is displaced from a neutral position as an additional control parameter for commanding the application software. For example, the direction the pod is moved from a reference point may be used to provide traditional x and y coordinates for transmitting a direction of movement to pointer command to the application software. However, the total distance the pod is moved from the reference point may be used to determine how fast the commanded direction of movement will take place.

The control buttons are preferably programmable. The programmable buttons and pod movement commands may be programmed "on the fly," meaning the system has a programming mode that, when activated, remembers a series of commands as they are entered and stores those commands to be activated again in the future simply by pressing the control button, or moving the pod in the commanded direction. Each button may also be programmed through an improved user interface that includes preferred commands for a collection of popular software applications, and identifies the actual commands associated with each programmed function.

The control device provides feedback to the user regarding the programmed status of each button and available pod movements. In particular, each programmable button has a lightable collar that is illuminated when the associated button is programmed, and flashes when that button is in programming mode, serving as an indicator to the user of the programmed status of each button. The graphical user interface displays the programmed commands associated with each programmable control button and the available pod movements.

Preferably, the commands associated with pod movement, are logically associated with related user application software commands, such that movement of the pod is intuitive of the programmed command. For example, pod movement can be programmed to control the "camera" view of a user application software game, such that movement of the pod in a particular direction, commands the "camera" view to move in that direction. Similarly, one of the finger-engaging portion mounted control buttons may serve as a "zoom" button, which can be programmed to command the "camera" view to zoom in or out based on the selected position of the button. In addition, routine and regular gaming commands may be grouped together for actuation in a single or logically related group of programmable control buttons, allowing quick access and smooth operation through the game.

Such programming allows the user to quickly and simultaneously enter map or camera movement commands by moving the pod and related game commands by pressing the readily accessible programmed control buttons while keeping the mouse and keyboard free to enter other commands. As a result, games may be played more easily and quickly, because the need for the user to stop and key-in redundant information is reduced. Moreover, in some applications, the need for a user to enter any information through a mouse or keyboard is eliminated.

BRIEF DESCRIPTION OF THE DRAWINGS

FIG. 2 is a top plan view of a controller in conformance with a preferred embodiment of the present invention.

FIG. 3 is a side plan view of the controller of FIG. 1.

FIG. 6A is an enlarged top detail view of the slider mechanism of the controller of FIG. 1 showing a possible neutral position of the slider mechanism.

FIG. 6B is an enlarged fragmentary top detail view of the slider mechanism of FIG. 5 showing a possible deflected position of the slider mechanism.

FIG. 9A is an enlarged detail view of the pod shaft assembly of FIG. 7 showing possible axial displacement in one direction.

FIG. 9B is an enlarged detail view of the pod shaft assembly of FIG. 9A showing possible axial displacement in a second direction.

DETAILED DESCRIPTION OF THE INVENTION

A. Exemplary Operating Environment

Figure 1:
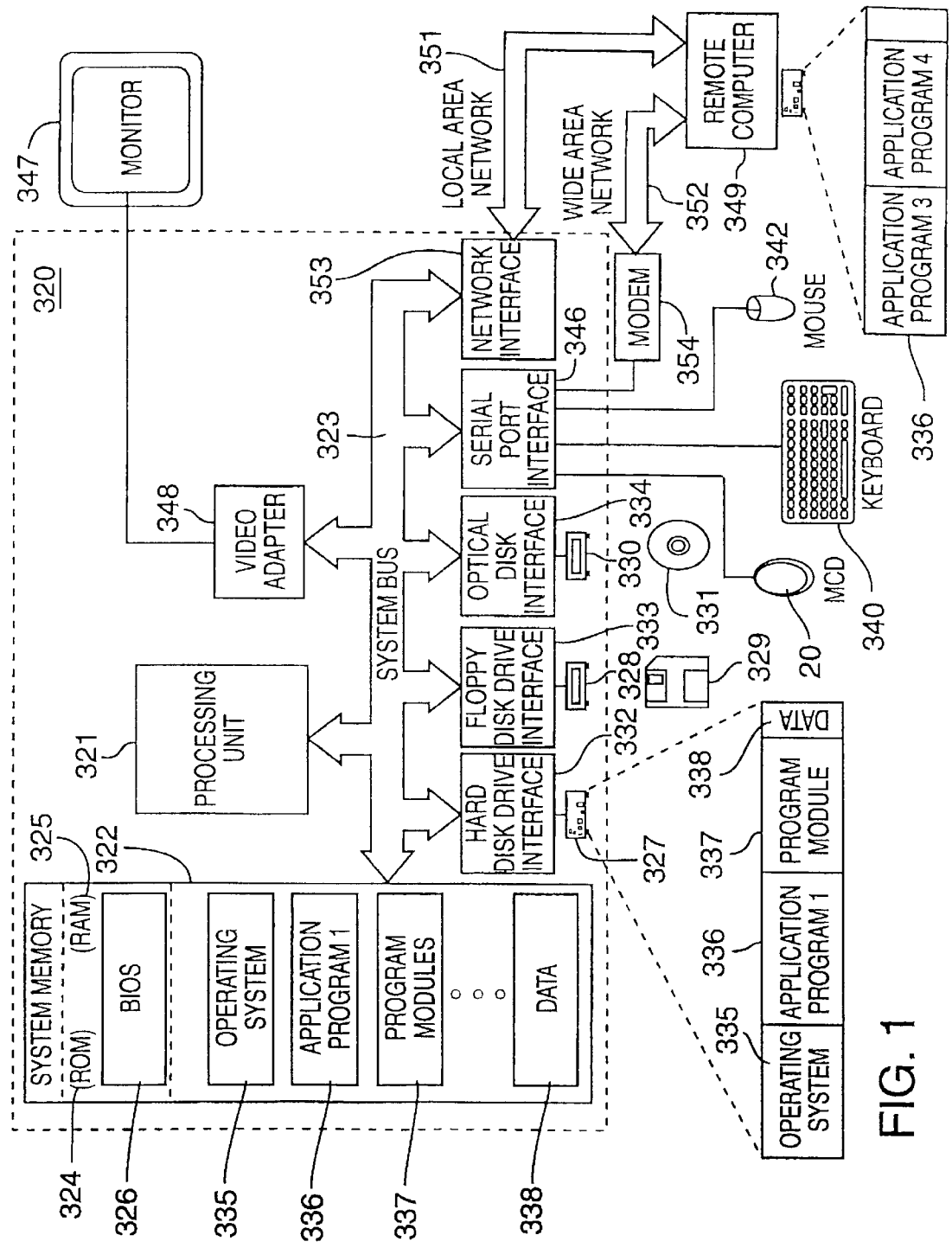
FIG. 1 is a block diagram of a personal computer that provides an exemplary operating environment for a preferred embodiment of the present invention.

FIG. 1 and the following discussion are intended to provide a brief, general description of a suitable computing environment in which the invention may be implemented. Although not required, the invention will be described in the general context of computer executable instruction, such as program modules, being executed by a personal computer. Generally, program modules include routines, programs, objects, components, data structures, etc. that perform particular tasks or complement particular abstract data types. Moreover, those skilled in the art will appreciate that the invention may be practiced with other computer system configurations, including hand-held devices, multiprocessor systems, microprocessor-based or programmable consumer electronics, gaming consoles, network PCs, minicomputers, mainframe computers, "post-PC" devices, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 320, including a processing unit 321, a system memory 322, and a system bus 323 that couples various system components including the system memory to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system 326 (BIOS), containing the basic routines that helps to transfer information between elements within the personal computer 320, such as during start-up, is stored in ROM 324. The personal computer 320 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of computer readable instructions, data structures, program modules and other data for the personal computer 320. Although the exemplary environment described herein employs a hard disk, a removable magnetic disk 329 and a removable optical disk 331, it should be appreciated by those skilled in the art that other types of computer readable media which can store data that is accessible by a computer, such as magnetic cassettes, flash memory cards, digital video disk, Bernoulli cartridges, random access memories (RAMs), read only memories (ROM), and the like, may also be used in the exemplary operating environment.

A number of program modules may be stored on the hard disk, magnetic disk 329, optical disk 331, ROM 324 or RAM 325, including an operating system 335, one or more application programs 336, other program modules 337, and program data 338. A user may enter commands and information into the personal computer 320 through input devices such as a keyboard 340 and pointing device 342, such as a mouse. Preferably, a movable control device 20 having programmable control buttons 94a–f (FIG. 2) is connected to the processing unit 321 through the universal serial bus (USB), but it may be connected by other interfaces, such as a parallel port game or game port. Other input devices (not shown) may include a microphone, joystick, game pad, satellite dish, scanner, or the like. These and other input devices are often connected to the processing unit 321 through serial port interface 46 that is coupled to the system bus, but may be connected by other interfaces, such as a parallel port, game port or a universal serial bus (USB). A monitor 347 or other type of display device is also connected to the system bus 323 via an interface, such as a video adapter 348. In addition to the monitor, personal computers typically include other peripheral output devices (not shown), such as speakers and printers.

The personal computer 320 may operate in a networked environment using logical connections to one or more remote computers, such as a remote computer 349. The remote computer 349 may be another personal computer, a server, a router, a network PC, a peer device or other common network node, and typically includes many or all of the elements described above relative to the personal computer 320, although only a memory storage device 350 has been illustrated in FIG. 1. The logical connections depicted in FIG. 1 include a local area network (LAN) 351 and a wide area network (WAN) 352. Such networking environments are commonplace in offices, enterprise-wide computer networks, intranets and the Internet.

When used in a LAN networking environment, the personal computer 320 is connected to the local network 351 through a network interface or adapter 353. When used in a WAN networking environment, the personal computer 320 typically includes a modem 354 or other means for establishing communications over the wide area network 352, such as the Internet. The modem 354, which may be internal or external, is connected to the system bus 323 via the serial port interface 346. In a networked environment, program modules depicted relative to the personal computer 320, or portions thereof, may be stored in the remote memory storage device. It will be appreciated that the network connections shown are exemplary and other means of establishing a communications link between the computers may be used.

Moreover, those skilled in the art will appreciate that the control device of the present invention may be used to input control commands to any application where there is user input needed to command the application, including, but not limited to, entering commands into hand-held devices, multiprocessor systems, microprocessor-based or programmable consumer electronics, gaming consoles, "post-PC" devices, network PCs, minicomputers, mainframe computers, and the like.

B. General Assembly of the Preferred Control Device

Figure 5A:
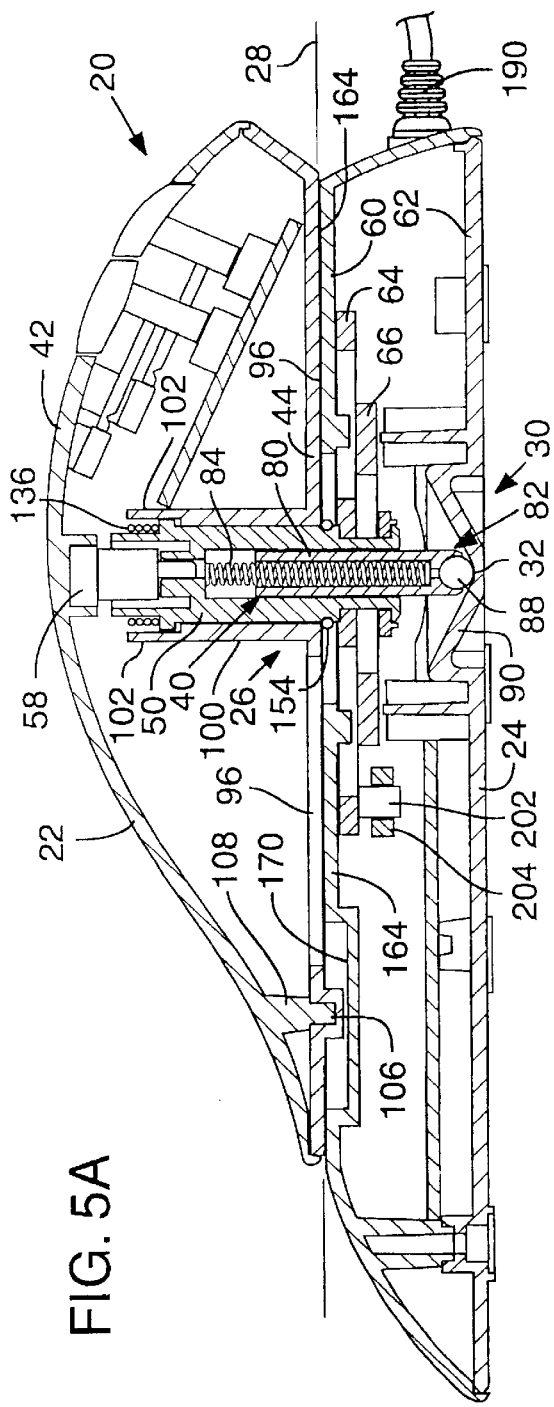
FIG. 5A is an enlarged cross-sectional view of the controller of FIG. 1 taken along line 5—5 of FIG. 1.
Figure 5B:
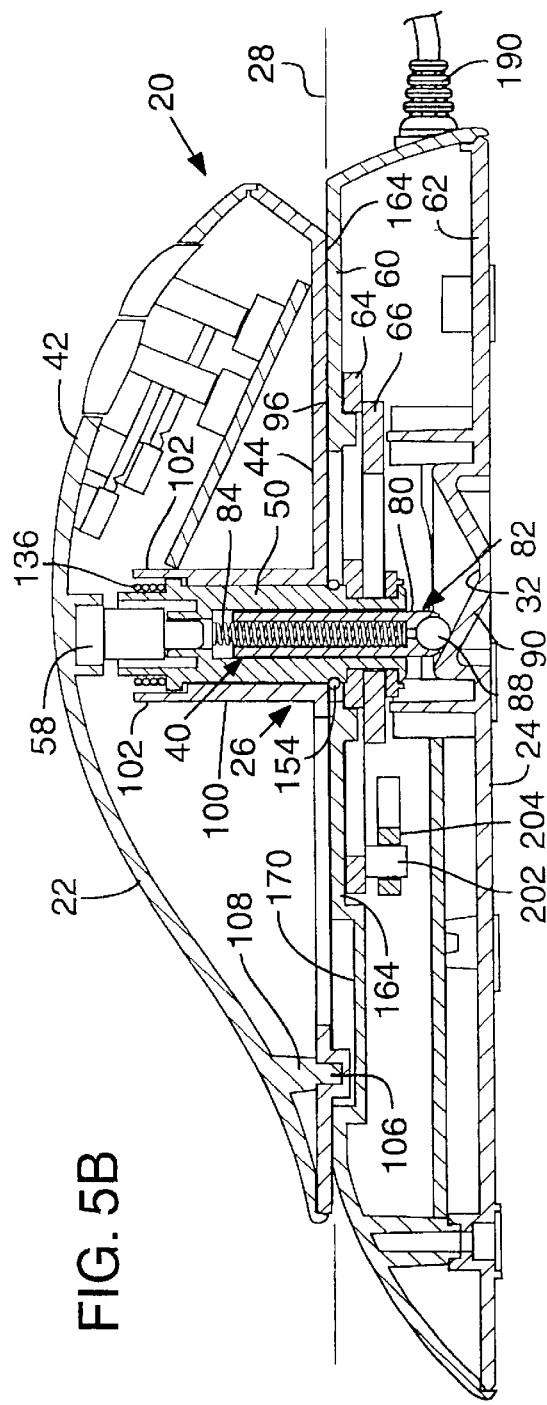
FIG. 5B is an enlarged cross-sectional view of the controller of FIG. 5A showing possible linear displacement of the pod with respect to the base.

As best shown in FIGS. 2 & 3, the pod 22 preferably is able to move, slide, and rotate simultaneously in three different directions along a defined plane with respect to the base 24: forward and backward in the direction of arrow 34, side-to-side in the direction of arrow 36, and axially about axis 38. This allows the pod 22 to move in all directions along the plane, including, for example, in directions diagonal to the forward and backward direction and side-to-side direction as shown by arrows 37a, 37b, 37c, & 37d (FIG. 2). As shown in FIG. 5B, when the pod is moved away from its neutral position 30 (FIG. 5A), a force generator 40 generates a resistance to movement force to the pod 22 along the plane 28 (FIG. 3) in the direction from the pod to the reference point 32. Preferably this resistance to movement force causes the pod 22 to return to its neutral position 30 when released.

Figure 4:
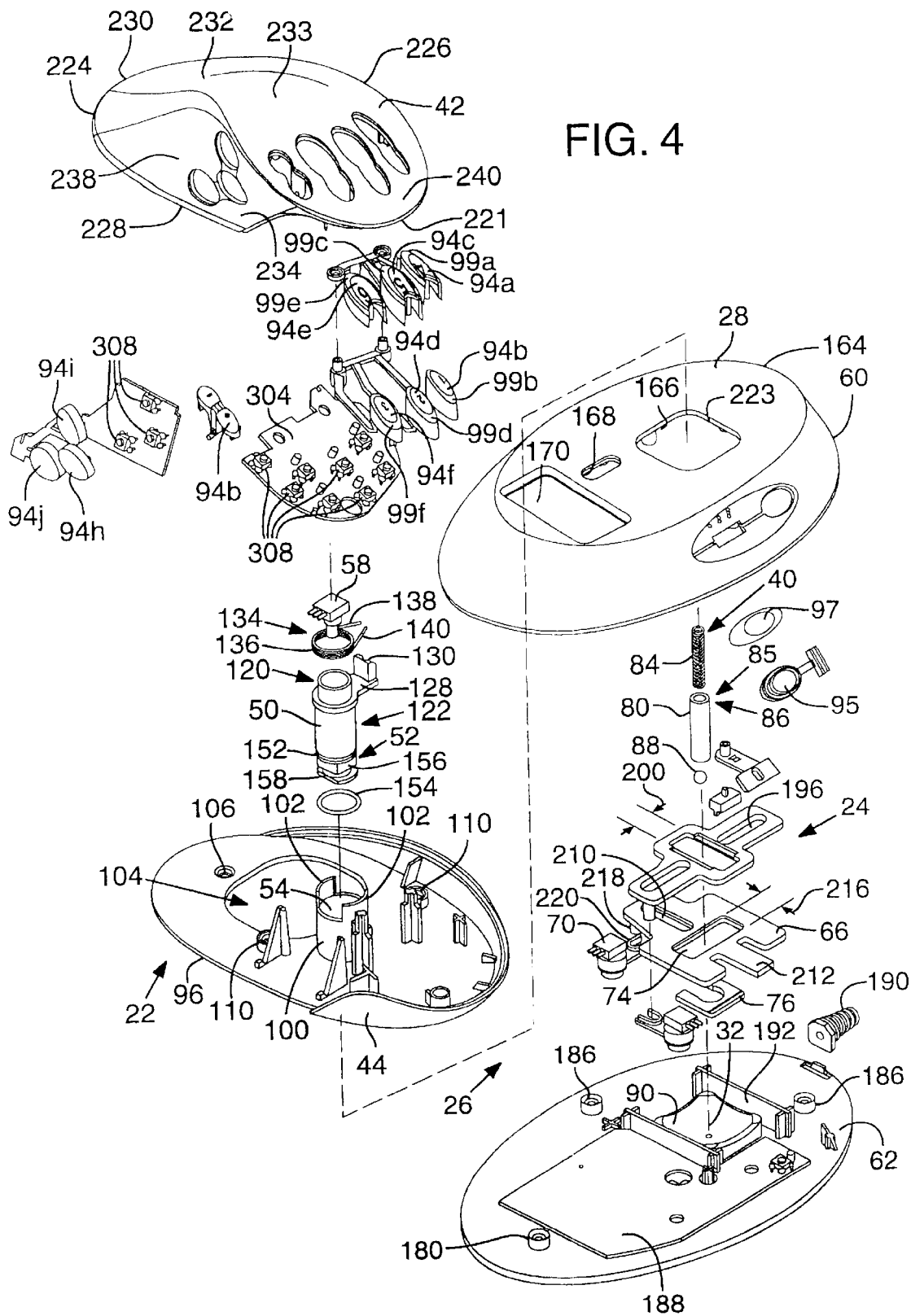
FIG. 4 is an exploded, isometric view of the controller of FIG. 1.
Figure 8:
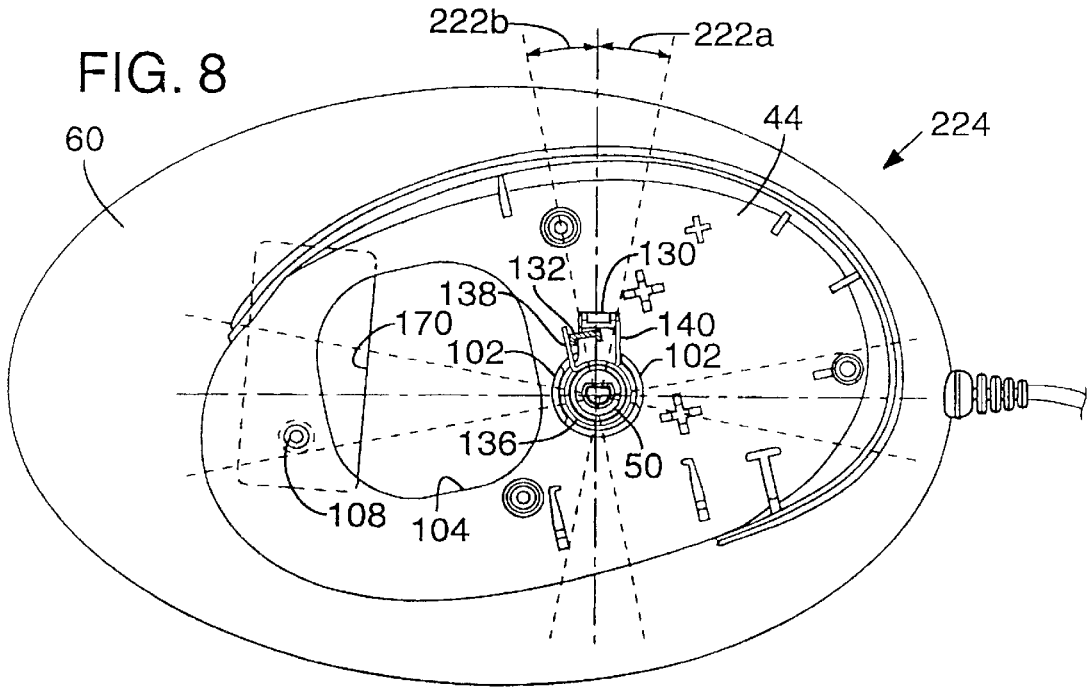
FIG. 8 is an enlarged fragmentary top plan view of the controller of FIG. 7 showing possible axial displacement of the pod with respect to the base.

In general and referring to FIG. 4, the pod 22 includes a pod upper portion 42 secured to a pod lower portion 44 defining a space therein. A pod shaft 50 having a distal end 52 extends through a pod shaft recess 54 in the pod lower portion 44 and into the base 24. As best shown in FIG. 8, the pod 22 may twist axially 38 on the pod shaft 50, preferably over a limited range of movement, and a first sensor 58 (FIG. 4) is operably secured to the pod 22 and pod shaft 50 to detect this movement.

The base 24 includes a base upper portion 60 and a base lower portion 62 as shown in FIG. 4. Upper (or first) and lower(or second) sliders 64, 66, respectively, are orthogonally mounted and secured to the base 24, preferably at the base upper portion 60. Second and third sensors 68, 70, respectively are operably secured to each slider 64, 66, to detect displacement of each slider 64, 66. Each slider 64, 66 includes a recess 72, 74 for receiving the pod shaft 50, which is secured to the sliders 64, 66 and associated base 24 with shaft lock 76.

A retractable shaft 80 is slideably secured to the distal end 52 of the pod shaft 50 and biased to an extended position 82, preferably by compression spring 84. The distal end 85 of the retractable shaft 80 includes a contour engaging portion 86, preferably a ball bearing 88 journaled to the retractable shaft 80.

The base lower portion 62 includes a contour surface 90 sized and shaped to receive the contour-engaging portion 86 of the retractable shaft 80. The contour surface 90 is shaped such that the retractable shaft 80 is at its most extended position 82 when the contour engaging portion 86 is at the reference point 32 on the contour surface 90. This defines the neutral position 30 of the pod 22 with respect to the base 24. Each of these components are discussed in greater detail below.

C. Pod Assembly

As best shown in FIG. 4, the pod 22 includes a pod upper portion 42 secured to a pod lower portion 44 defining a cavity for receiving components therein. Preferably, the pod 22 is sized and shaped to fully support a user's left or right hand and constructed with a durable material, such as Acrylonitrile-Butadiene-Styrene ("ABS") polymer. More preferably, the pod upper portion is sized and contoured to fully support the user's left hand, and it includes programmable control buttons 94a–f and zoom button 94g that are easily activated by the user's left fingers, and thumb-actuated control buttons 94h–j, which are easily activated by the user's left thumb, while still permitting the user to simultaneously move the pod 22 throughout its three different directions of movement.

As best shown in FIG. 4, the preferred pod shape includes a front side 221, a rear side 224, a left side 226, and a right side 228, with a palm engaging portion 236 positioned toward the left and rear sides 226, 224, respectively, a finger engaging portion 240 positioned toward the front side 221, and a thumb engaging portion 238 along the right side 228. The palm engaging portion 236 is a smoothly contoured surface extending from a horizontal lip 230 positioned along the rear side 224 of the pod 22, slightly upwards along an essentially convex surface 232, and it is sized to support a user's palm with their fingers extending toward the front side 221 of the pod 22. Preferably, a smoothly transitioning concave surface 233 extends from the convex surface 232 to the left side 266 of the pod 22.

The convex surface 232 continues from the palm engaging portion 236 generally downward toward the front side 221 of the pod 22, defining the finger engaging portion 240 of the pod 22. Preferably, the convex surface 232 in the finger engaging portion 240 of the pod 22 is sized to support a user's fingers with control buttons 94a–f and zoom button 94g positioned toward the front side 221 of the pod 22 so that the user's finger tips rest on these buttons with the user's palm resting on the palm engaging portion 236 of the pod 22. Preferably, the control buttons 94a–f and zoom button 94g are designed to not activate simply by having a user's fingers resting on them, thereby avoiding inadvertent activation of them.

The thumb engaging portion 238 of the pod 22 includes a generally vertical surface 234 positioned adjacent to the right side 228 of the pod, towards the front side 221 of the pod 22 as shown in FIG. 3. The vertical surface 234 is sized to support a user's thumb when the user's palm is resting on the palm engaging portion 236 of the pod 22. The vertical surface 234 includes thumb-actuated control buttons 94h–j positioned along the vertical surface 234 that may be activated by the user's thumb without requiring the user to lift his or her palm from the palm engaging portion 236. The vertical surface 234 smoothly transitions into the horizontal lip 230 towards the rear side 224 of the pod 22 and the convex surface 232 of the palm and finger engaging portions 236, 240, respectively, of the pod 22 as best shown in FIG. 4.

The pod lower portion 44 has a smooth bottom surface 96 with a generally centrally located pod shaft recess 54 extending therethrough. Pod shaft recess 54 is sized for slideably receiving the pod shaft 50. Adjacent to the pod shaft recess 54 is an elevated collar 100 for supporting the pod shaft 50. Preferably, the upper portions of the collar 100 have opposing extending tabs 102. A large opening 104 in the pod lower portion 44 allows control wires (not shown) and the like to pass between the pod 22 and base 24. Toward the rear of the pod lower portion 44 is an outwardly extending tab 106. Preferably mounting pillars 108 (FIG. 10) in the pod upper portion 42 extend to mating mounting recesses 110 in the pod lower portion 44, thereby allowing the pod upper portion 42 and pod lower portion 44 to be detachably secured together.

D. Pod Shaft Assembly

The pod shaft 50 includes a top, or first, end 120 having a pod engaging portion 122 and an opposing distal end portion 52 at its opposite end. The pod engaging portion 122 is preferably cylindrically shaped and sized to be rotatably secured within pod shaft recess 54 of the pod lower portion 44 and supported by collar 100. Protrusion 128, which is rigidly secured to the pod shaft 50, extends generally radially from the pod engaging portion 122 of the pod shaft 50 near the first end 120. Protrusion 128 includes an upwardly extending extension 130 aligned generally parallel to the pod shaft 50.

Figure 7:
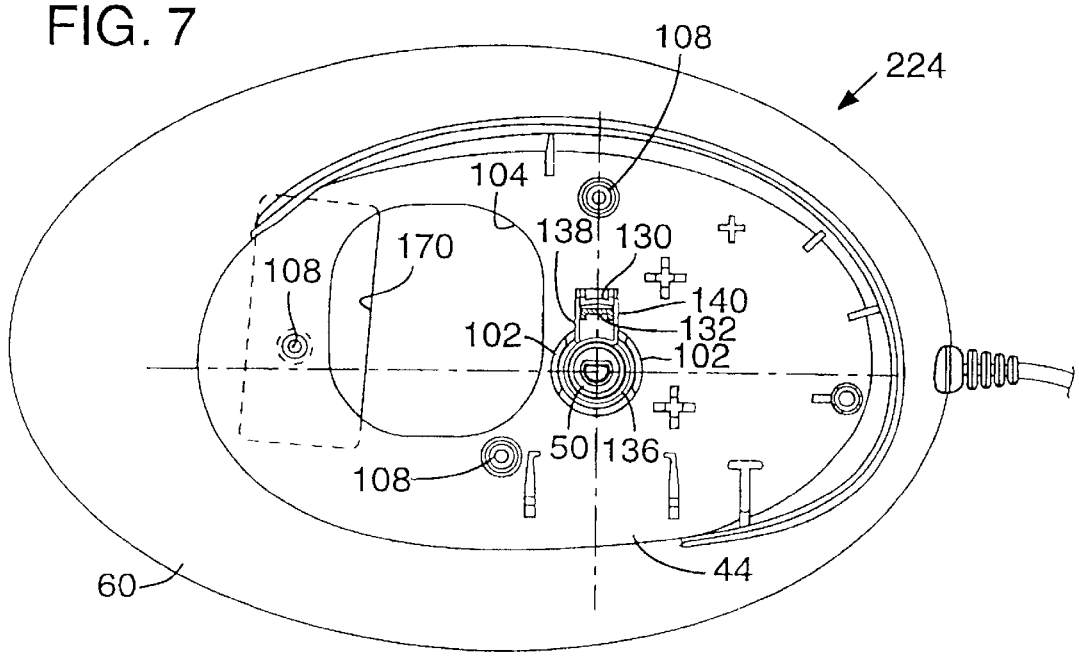
FIG. 7 is an enlarged fragmentary top plan view of the controller of FIG. 1 showing possible orientation of the pod shaft assembly.
Figure 10:
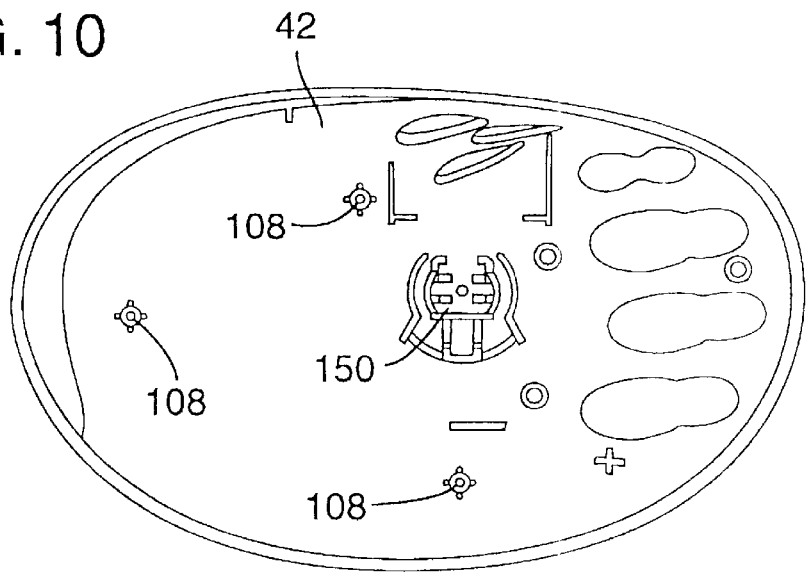
FIG. 10 is an enlarged bottom plan view of the pod upper portion of the controller of FIG. 1.

As best shown in FIGS. 7 and 10, pod upper portion 42 (FIG. 10) includes a downward extension 132 aligned to occupy a position between the pod shaft 50 and the upwardly extending extension 130. Torsion spring 134, includes a coil portion 136 and two ends 138, 140. Preferably, the coil portion 136 rests on the first end 120 of the pod shaft 50 with one end 138, 140 positioned on each side of the upwardly extending extension 130 as shown in FIG. 7. First sensor 58 is preferably a potentiometer secured in first mounting portion 150 of the pod upper portion 42 (FIG. 10) and pivotally secured to pod shaft 50 at the first end 120. First sensor 58 detects the axial movement 38 of the pod 22 with respect to the pod shaft 50.

The distal end 52 of the pod shaft 50 is sized to extend outwardly from the pod lower portion 44 through the pod shaft recess 54. The distal end 52 includes an o-ring recess 152 for receiving o-ring 154, a slider engaging portion 156, which preferably has a generally square cross-section, and a shaft lock recess 158 for receiving shaft lock 76.

The retractable shaft 80 is slideably secured to the distal end 52 of said pod shaft 50. A device for urging the retractable shaft 80 into its extended position 82, such as a compression spring 84, is received within the pod shaft 50.

The distal end of the retractable shaft 80 protrudes from the distal end 52 of the pod shaft 50 and includes a contour engaging portion 86, preferably a ball bearing 88 journaled to the distal end of the retractable shaft 80.

E. Base Assembly

As best shown in FIG. 3, the base 24 includes the base upper portion 60 secured to the base lower portion 62 defining a cavity for receiving components therein. Preferably, the base 24 is constructed with a durable material such as ABS polymer. More preferably, the base 24 includes record on the fly, or record, button 95 and profile slider switch 97, which are easily activated by the user's thumb without the user being required to release the pod 22.

Figure 11:
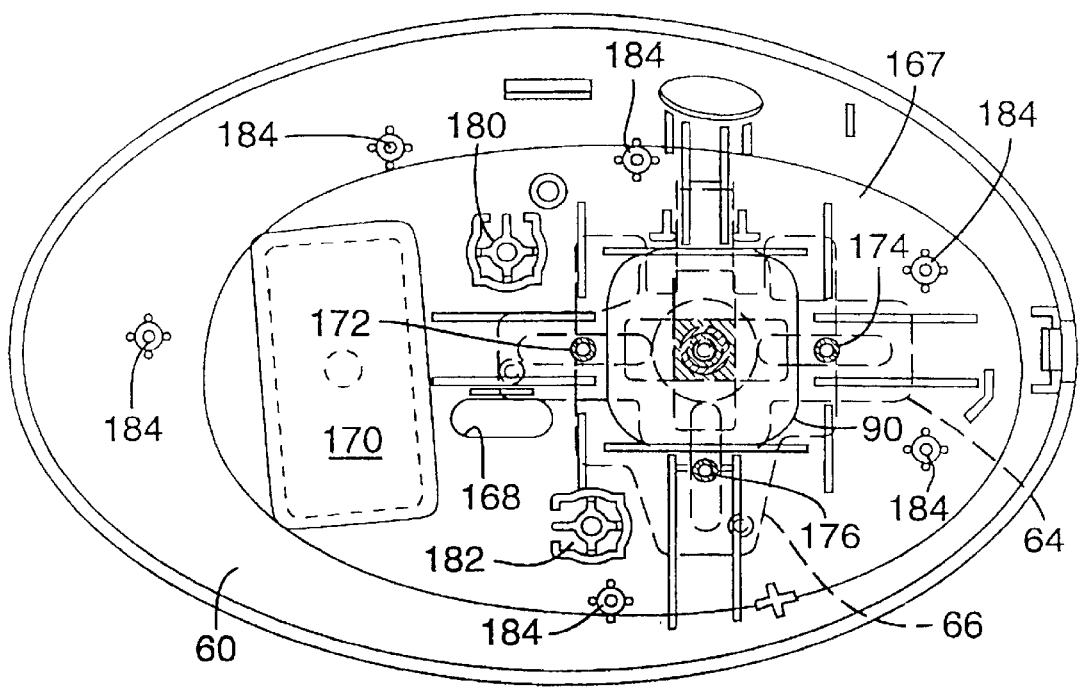
FIG. 11 is an enlarged bottom plan view of the base upper portion of the controller of FIG. 1.

The base upper portion 60 has a smooth upper surface 164 for slideably engaging the bottom surface 96 of the pod lower portion 44. It also includes a first opening 166 for receiving the distal end 52 of the pod shaft 50, a second opening 168 for receiving wires (not shown) and the like through the large opening 104 in the pod lower portion 44, and a recess 170 for engaging tab 106 of the pod lower portion 44. As best shown in FIG. 11, the under side 167 of the base upper portion 60 includes slider mounts 172, 174, 176 for slideably receiving supper and lower sliders 64, 66, second and third sensor mounts 180, 182 for receiving second and third sensors 68, 70, respectively, and, preferably, base mounting pillars 184 that extend to mating base mounting recesses 186 in the base lower portion 62 (FIG. 4), thereby allowing the base upper portion 60 and lower 62 to be detachably secured together.

The base lower portion 62 includes a contour surface 90 sized and shaped to receive the contour-engaging portion 86 of the retractable shaft 80. The contour surface 90 is shaped such that the retractable shaft 80 is at its most extended position 82 when the contour engaging portion 86 is at the reference point 32 on the contour surface 90. Preferably, the contour surface 90 is conical shaped, having a v-shaped cross-section. More preferably, the base lower portion 62 is also sized to accommodate an electronics board 188 and a grommet 190, with protective partitions 192 separating the contour surface 90 from these components and supporting the lower slider 66 as best shown in FIGS. 4, 5A, and 5B.

Upper and lower sliders 64, 66, respectively, are orthogonally mounted and secured to the base, preferably to the base upper portion 60 at slider mounts 172, 174, 176. In particular, the upper slider 64 is an elongate planar element having aligned first and second sliding recesses 194, 196 for engaging the first and second slider mounts 172, 174, respectively, and a pod shaft engaging portion 72. The pod shaft engaging portion 72 is an essentially rectangular opening aligned transverse to the first and second sliding recesses 194, 196. The width 200 of the pod shaft engaging portion 72 is sized to slideably receive the slider engaging portion 156 of the pod shaft 50. One end of the upper slider 64 includes nub 202 for a first sensor arm 204 pivotally secured to second sensor 68. Preferably, second sensor 68 is a potentiometer secured to the base upper portion 60, and the upper slider 64 is constructed with strong, but resilient material having a low coefficient of friction such as a polymer. One known preferable polymer is sold by Germany based Hoechst Company under the trademark CELANESE M-90.

Similarly, the lower slider 66 is an elongate planar element having a sliding recess 210 for engaging the third slider mount 176, an opposing sliding portion 212, and a pod shaft engaging portion 74. The opposing sliding portion 212 is used in this area, rather than a recess, because of limited room in this area. The pod shaft engaging portion 74 is an essentially rectangular opening aligned transverse to the sliding recess 210. The width 216 of the pod shaft engaging portion 74 is sized to slideably receive the slider engaging portion 156 of the pod shaft 50. One end of the lower slider includes nub 218 for a second sensor arm 220 pivotally secured to the third sensor 70. Preferably, third sensor 70 is a potentiometer secured to the base upper portion 60, and the lower slider 66 is constructed with strong, but resilient material having a low coefficient of friction, such as a polymer. One known preferable polymer for the lower slider is sold by Germany-based Hoechst Company under the trademark CELANESE SW-01.

The pod 22 is installed on the base 24 by inserting the distal end 52 of the pod shaft 50 into pod shaft recess 54 in the pod lower portion 44 and through the first opening 166 in the base upper portion 60. The slider engaging portion 156 of the pod shaft 50 is inserted into the pod shaft engaging portions 72, 74 of the upper and lower sliders 64, 66 and secured in place by shaft lock 76.

With the shaft lock 76 securing the pod shaft 50 in place, the pod 22 is slideably secured to the base 24. However, the pod 22 is movable in all directions along plane 28 within a range of motion defined by the size of first opening 166. In particular, FIG. 6A shows the pod shaft 50 interaction with sliders 64, 66 when the pod 22 is in its neutral position 30. The center of the pod shaft 50 is aligned with the center of the contour surface 90 at the reference point 32. FIG. 6B shows one possible movement of the pod 22 away from its neutral position 30. In the particular pod movement shown in FIG. 6B, the pod 22 has been moved along its plane 28 of movement in a direction 45 degrees from both its forward-and-backward direction 34 and side-to-side direction 36. The upper and lower sliders 64, 66 accommodate this movement by sliding along their respective slider mounts 172, 174, 176 and the pod shaft 50 sliding within the respective pod shaft engaging portions 72, 74 as shown in FIG. 6B. Second and third sensors 68, 70 detect the relative position of their respective sliders 64, 66. It can be appreciated that similar interaction of the sliders 64, 66 with the pod shaft 50 will permit the pod 22 to be moved in any direction along the defined plane 28 with the sensors 68, 70 detecting the relative position of the pod 22 with respect to the base 24.

As best shown in FIG. 4, preferably, the diameter of the contour surface 90 is as large, or larger, than the first opening 166, and o-ring 154 cushions the pod shaft 50 when it engages the edge 223 of the first opening 166. Also, to promote quiet operation of the sliders 64, 66, it is desirable to coat them with a small amount of a suitable lubricant.

Preferably the axial movement of the pod is limited to a small arc range 222a, 222b in both directions from an axial neutral position 224 as shown in FIGS. 7 & 8. This is accomplished by the ends 138, 140 of the torsion spring 134 colliding with the extending tabs 102 of the collar 100, and the outwardly extending tab 106 in the rear of the pod lower portion 44 reaching a defined limit in recess 170 of the base upper portion 60.

When the pod 22 is rotated axially about the pod shaft 50, the pod 22 is urged to return to its axial neutral position 224. In particular, and as best shown in FIG. 7, when the pod is in its axial neutral position 224, the downward extension 132 of the pod upper portion 42 is positioned between the pod shaft's upwardly extending extension 130 and the pod shaft 50. Accordingly, the ends 138, 140 of the torsion spring 134 do not engage the downward extension 132 of the pod upper portion 42. As best shown in FIGS. 8, 9A, & 9B, when the pod 22 is rotated about the pod shaft 50, the downward extension 132 moves to engage one of the coil spring ends 138, 140. Accordingly, when the pod is released, the engaged torsion spring end 138 or 140 urges the downward extension 132, and thereby the pod 22, to return to its axial neutral position 224.

The pod itself is also biased to a neutral position 30 within its defined plane 28 of movement. As best shown in FIG. 5A, the neutral position 30 is attained when the retractable shaft 80 at its most extended position 82 while the contour engaging portion 86 engages the contour surface 90 of the base lower portion 62. As shown in FIG. 5B, when the pod 22 is moved from its neutral position 30 in any direction along its plane 28 of movement, the contour engaging portion 86 of the retractable shaft 80 is urged to retract, thereby compressing compression spring 84. This compression of spring 84, serves as a force generator 40, and causes the user to feel a force on the pod 22 directed from the pod in a direction toward the neutral position 30 of the pod, thereby indicating to the user the direction of displacement.

Preferably, this force generated when the pod 22 is moved from its neutral position 30 is strong enough to return the pod to its neutral position 30 when released by its user. One known amount of force that returns the pod to its neutral position is using a compression spring 84 that generates ½ pound force when compressed. Other spring forces can be used depending on the particular design of the device and the coefficient of friction between the engaging components.

The planar movement of the pod 22, which is detected by second and third sensors 68, 70, can be used to send x and y coordinate information to a game "camera" view, map view, a cursor, or the like with known means and methods. Moreover, the axial movement 38 of the pod 22 about its pod shaft 50, which is detected by first sensor 58, can be used to command rotation speed, view direction, or the like, with known means and methods.

F. Proportional Control

Figure 17:
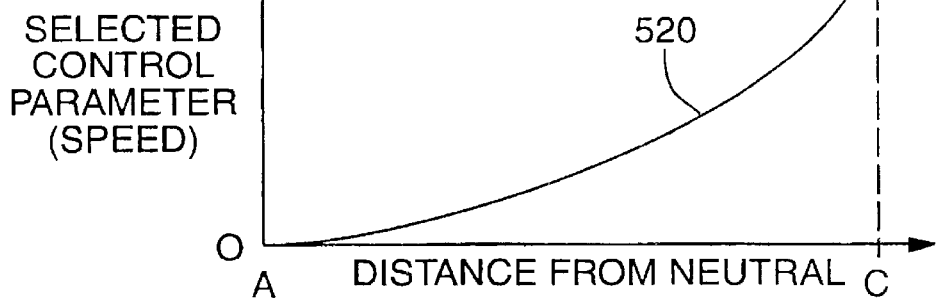
FIG. 17 is an exemplar relationship chart showing one possible proportional relationship between a selected software application command with the distance the controller is moved from its neutral position in accordance with a preferred embodiment of the present invention.

Preferably, the control device 20 also offers a control parameter based on the proportional distance the pod 22 is displaced from its neutral position 30. In particular, and as best shown in the chart of FIG. 17, a software application command, such as speed in gaming software, can be commanded based on the distance the pod 22 is displaced from its neutral position. For example, point A in FIG. 17 represents the pod being positioned at its neutral position. Accordingly, the speed command is zero when the pod is in its neutral position. However, when the pod is moved away from its neutral position, to point C for example, the commanded speed increases along curve 520.

More preferably, the speed command proportionally increases the further the pod is displaced from its neutral position. Accordingly, if a user only slightly deflects the pod 20 a slow speed command will be executed. However, a large displacement of the pod from its neutral position results in a faster speed as shown in FIG. 17. This feature can be activated either by the user programming it to do so, or by the feature being preprogrammed by the user application software.

Moreover, as best shown in FIG. 5B, the more the pod 22 is moved away from its neutral position 30, the more the retractable shaft 80 compresses spring 84, thereby increasing the amount of return force felt by the user. Accordingly, as best shown by curve 522 in FIG. 18, the force felt by the user increases proportionally the further the pod is displaced from its neutral position. The increasing force serves to indicate to the user the increasing nature of the control parameter. In cases where the control parameter is speed, the more force the user feels, the faster the speed commanded by the controller to the application software.

In can be appreciated that this additional control parameter increases the controllability and usability of the device. For example, where the planar movement of the pod is used in the application software to command direction of an object, or as a pointer, the amount of displacement of the pod in that direction can command how fast the object or pointer should move in the commanded direction.

G. Control Buttons

1. General Assembly

Preferably, and as shown in FIGS. 2–4, 12 and 13, the controller 20 includes 6 independently operable and programmable control buttons 94a–f, and one zoom button 94g preferably positioned on the finger engaging portion 240 of the pod 22. The programmable control buttons 94a–f are preferably numbered 1–6 as shown in FIG. 2 to help user identification of them. The zoom button 94g includes a rocker portion that may toggle between activating two switches 308. Three additional thumb-actuated control buttons 94h–j are preferably positioned on the thumb-engaging portion 238 of the pod 22. A record-on-the fly, or record, button 95 and a profile slider switch 97, preferably having three different positions, are secured to the base upper portion 60 as best shown in FIG. 3. The record button 95 preferably includes a lightable portion that may be commanded to flash, or remain off.

Figure 12:
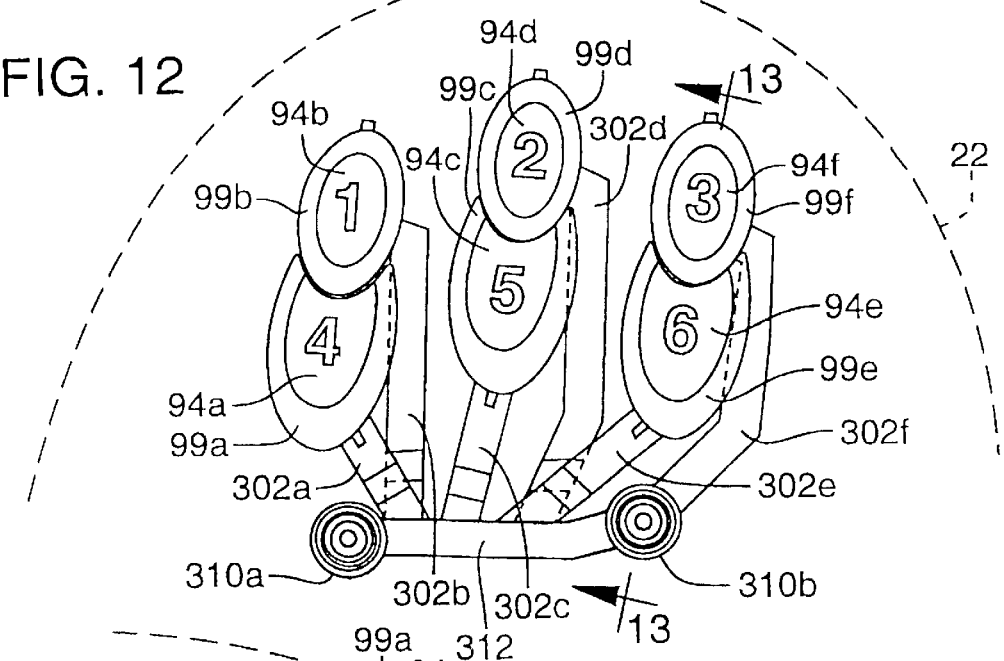
FIG. 12 is an enlarged top plan view of the control buttons in conformance with a preferred embodiment of the present invention.
Figure 13:
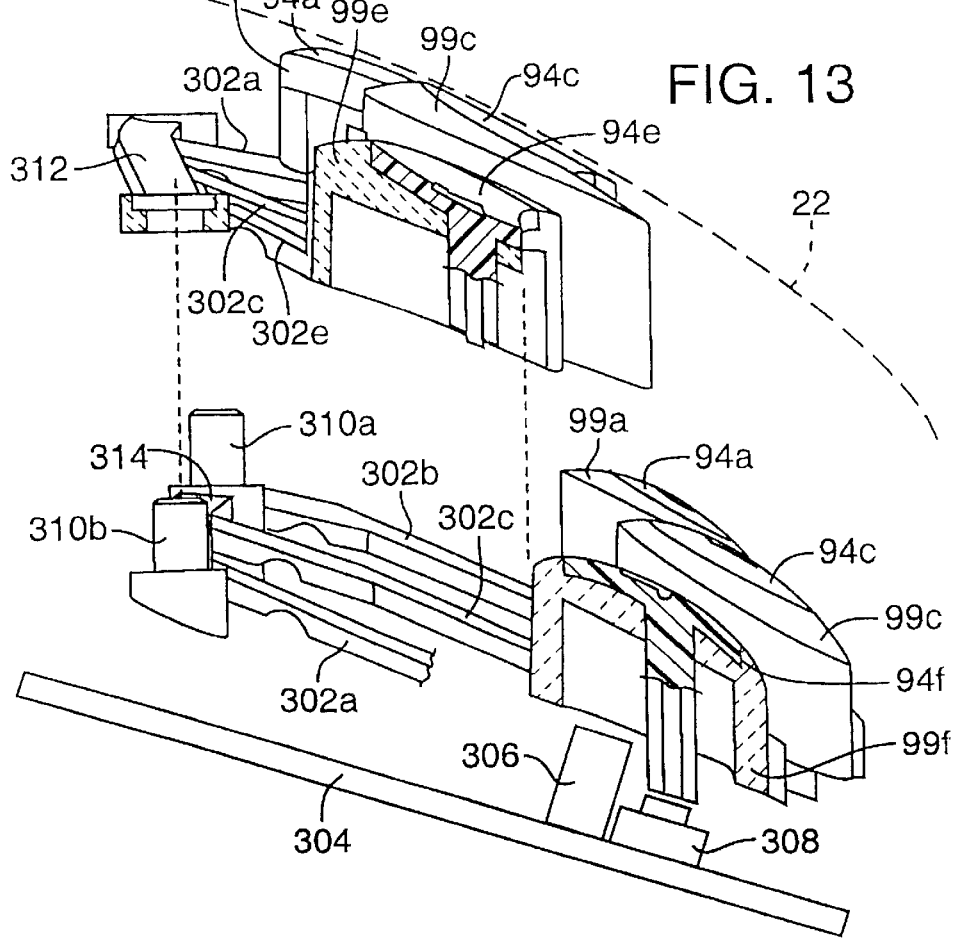
FIG. 13 is an exploded side cross sectional view of the control buttons of FIG. 12 taken along line 13—13 of FIG. 12.

Each programmable control button 94a–f preferably includes a lightable collar 99a–f, respectively, that may individually commanded to solidly light, flash, or turn off. As best shown in FIGS. 12 and 13, control buttons 94a, 94c, 94e are secured to upper mounting rail 312 through mounting levers 302a, 302c, 302e, respectively. Similarly, control buttons 94b, 94d, 94f are secured to lower mounting rail 314 through mounting levers 302b, 302d, 302f, respectively. Upper and lower mounting rails 312, 314 are secured to mounting nubs 310a, 310b extending from the underside of the pod upper portion 42. Referring to FIG. 13, each programmable control button 94a–f is positioned over a respective switch 308, which is mounted to switch mounting board 304 such that pressing the control button (button 94f is shown) engages the respective switch 308.

2. Programming the Control Buttons

The programmable control buttons 94a–f may be programmed with user selected commands through two different methods: record on the fly, and through a user interface. Each of these methods is discussed in greater detail below.

i. Record on the Fly

Record on the fly is a method for dynamically programming or changing the existing control commands programmed into a programmable control button 94a–f. When this mode of programming is activated, the system will remember commands as they are being entered through traditional methods, such as by using a keyboard and mouse, during the use of the application software, such as while playing a game. This process is referred to as "command mapping" or "button mapping." It will then allow the user to store those commands and associate them with one of the programmable control buttons 94a–f such that actuating that associated button 94a–f will cause those commands to be entered again, without the need to re-key them.

The detailed description which follows is represented largely in terms of processes and symbolic representations of operations by conventional computer components, including a processing unit, memory storage devices for the processing unit, and a display device. These operations include the manipulation of data bits by the processing unit and the maintenance of these bits within data structures resident in one or more of the memory storage devices. Such data structures impose a physical organization upon the collection of data bits stored within memory and represent specific electrical or magnetic elements. These symbolic representations are the means used by those skilled in the art of computer programming and the construction of computing devices to most effectively convey teachings and discoveries to others skilled in the art.

For purposes of this discussion, a process is generally a sequence of steps executed by a computing device leading to a desired result. These steps generally require physical manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind however, that these and similar terms should be associated with appropriate physical quantities for computing device operations, and that these terms are merely conventional labels applied to physical quantities that exist within and during operation of the computing device.

It should also be understood that manipulations within the computing device are often referred to in terms such as adding, comparing, moving, etc. which are often associated with manual operations performed by a human operator. The operations described herein are machine operations performed in conjunction with a human operator or user that interacts with a control device 20. The machines used for performing the operation of the preferred embodiment of the present invention, as will be understood, include control device 20 and other suitable input devices.

Figure 14:
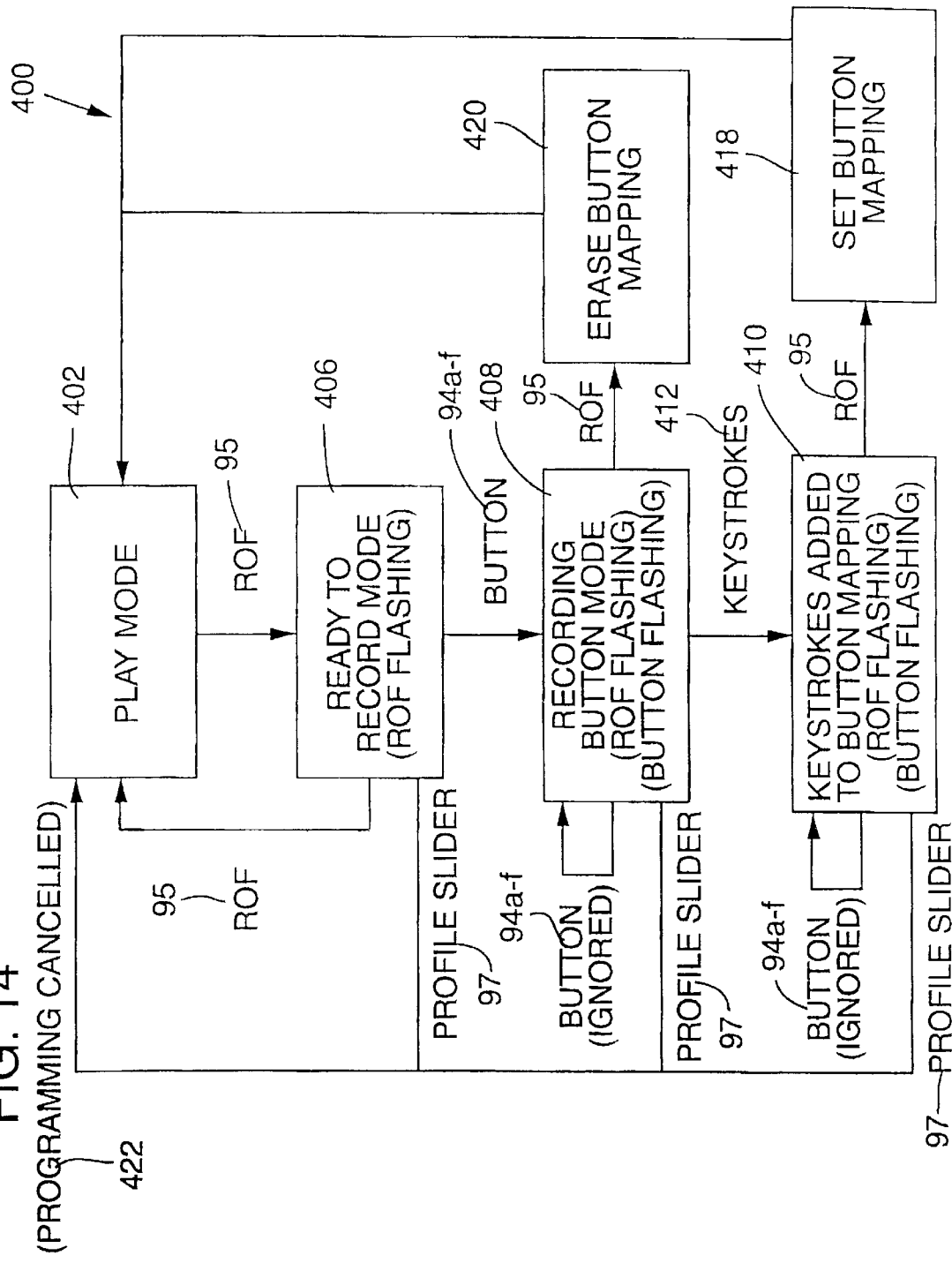
FIG. 14 is a flow chart describing the record on the fly button programming in accordance with a preferred embodiment of the present invention.

FIG. 14 is a flow chart describing the record on the fly button programming 400. In can be appreciated by one skilled in the art that the sequence of steps can be produced by a variety of executable code, memory, processes, and input devices working together. In particular, the control device 20 is initially set-up to operate in play mode 402, which allows the control device 20 to operate as a control device and send control command information to the installation software.

First, the user initiates record on the fly mode 406 by pressing the record button 95 on the base upper portion 60. This causes the record button 95 to flash. From record on fly mode, if the user presses the record button 95 again or moves the profile slider switch 97 to a different position, programming on the fly mode 406 is cancelled and the control device returns to play mode 402.

From record on the fly mode 406, the user initiates recording button mode 408 by actuating the control button 94a–f to be programmed. For purposes of this example, assume that control button 94f was selected. The other control buttons 94a–e are programmed in the same way by pressing them at this stage. This causes the lightable collar 99f encircling control button 94a to flash while the record button 95 remains flashing, thereby indicating that control button 94a is being programmed. If the user slides the profile slider switch 97 to a different position at this stage, recording mode 408 is cancelled and the control device 20 returns to play mode 402. If the record button is pressed at this stage, any button mapping previously associated with the selected control key 94f is erased 420 and the control device returns to play mode 402. If the control button 94f is pressed again at this stage, the command is ignored and the device remains in recording button mode 408.

Entry of any other keystrokes 412 or mouse commands at this stage will initiate added button mapping mode 410, which causes the keystrokes and mouse commands to be added to any existing button mapping for the selected control key 94f.

From added button mapping mode 410, the updated button mapping, including the new keystrokes and mouse commands, are stored in memory by pressing the record button 95. This causes the lightable portion of the record button to turn off, and the lightable collar 99f of the selected control button 94f to light, thereby indicating it has been programmed with the updated button mapping. Should the user slide the profile slider 97 to a different position while in added button mapping mode 410, the control device 20 returns to play mode 402 without updating the button mapping. Should the user select the control button from added button mapping mode 410, the command will be ignored.

This programming may be repeated for each programmable control button 94a–f. The zoom button 94g can be toggled between a forward ("+") and back ("−") position, and can be programmed with two commands (one of "+" and one for "−" positions). However, it is preferably preprogrammed as a gaming map control feature, and not routinely reprogrammed with other commands.

The thumb actuated control buttons 94h–j preferably serve as shift buttons, and the programmable buttons may be programmed either by selecting only them, or in combination with selecting one of the shift buttons 94h–j such that each programmable button may contain 4 separate sets of programmed commands. Accordingly there are a total of 24 different commands that may be programmed using these buttons 94h–j in combination with thumb actuated control buttons 94h–j. In addition, the profile switch 97 includes three different positions, thereby switching the user between three sets of 24 available programmable commands for a total of 72 potential commands.

ii. Programming Using User Interface

Another method for programming the programmable buttons 94a–f includes using a graphical user interface to record pre-selected preferred commands for a collection of popular software applications into the programmable buttons 94a–f, or to type in new commands.

Figure 15:
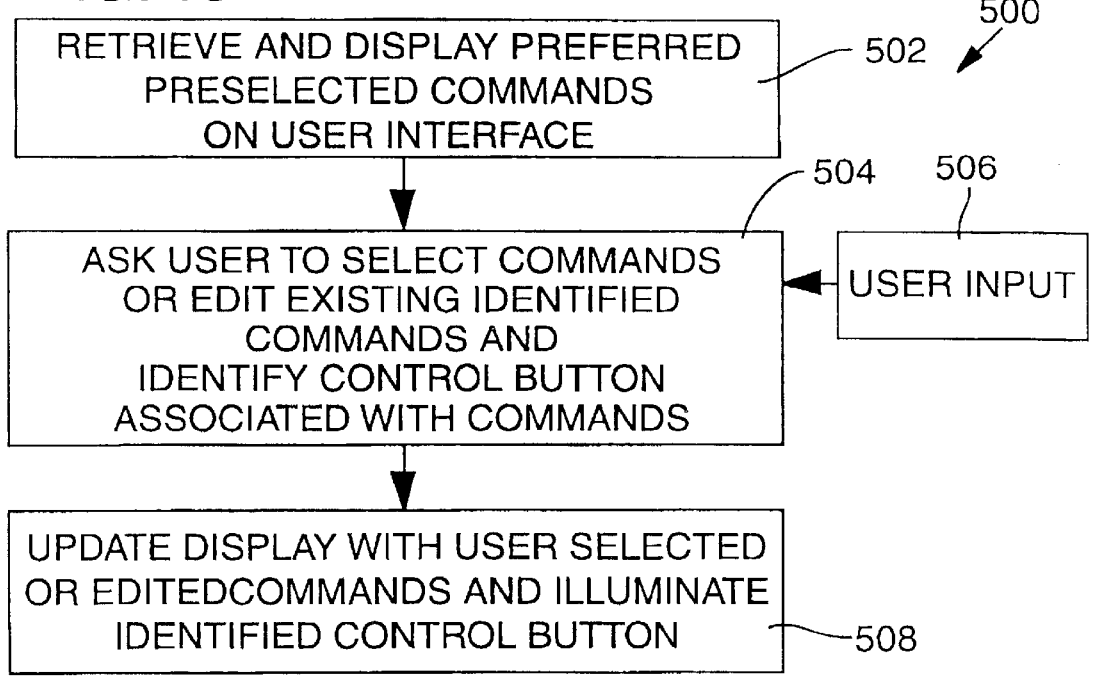
FIG. 15 is a flow chart describing a method for programming the programmable buttons using a user interface in accordance with a preferred embodiment of the present invention.

FIG. 15 is a flow chart describing how the programmable control buttons 94a–f may be programmed using a user interface. In can be appreciated by one skilled in the art that the sequence of steps can be produced by a variety of executable code, memory, processes, displays, and input devices working together. In particular, first pre-selected preferred commands for a given software application, such as a game, are retrieved and displayed on a user interface in accordance with step 402 of FIG. 15.

Figure 16A:
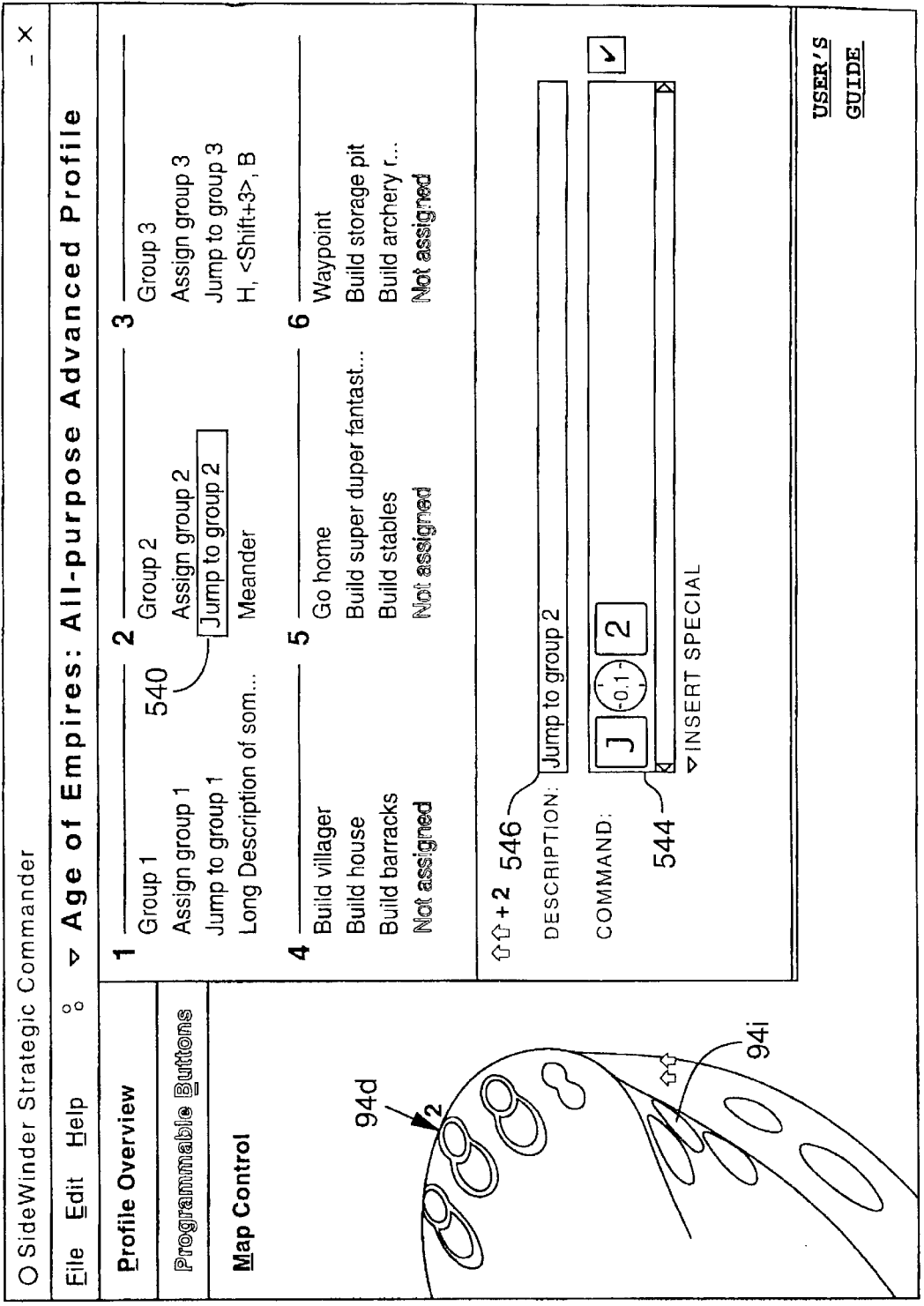
FIG. 16A is an exemplar user interface display illustrating a possible screen display associated with programming one of the control buttons of the control device in accordance with a preferred embodiment of the present invention.

Each control button is assigned a series of preferred commands, with one command being associated for each of the four available positions associated with each control button 94a–f, based on the shift button 94h–94j selection. For example, FIG. 16A shows a possible graphical user interface displaying several popular commands used in the game "AGE OF EMPIRES II THE AGE OF KINGS." The command highlighted by square 540 is "[j]ump to group 2," and it is associated with control button 94d used in conjunction with shift button 94i.

Should a user wish to change the programmed command associated with a particular control button 94a–f and shift button 94*h–j* combination, he or she selects the desired command to be revised, by using an appropriate input device 406, such as by "left clicking" a mouse control button when a cursor is positioned over the graphical representation of desired command to be programmed. For example, in FIG. 16A, a user may edit or reprogram the command associated with control button 94*d* used in conjunction with shift button 94*i* by highlighting the command associated with that position.

In the present example, the desired command to edit is "[j]ump to group 2." To edit it, a user positions a cursor over the command and "clicks" a mouse control button. This causes the command to appear in command line 544, and a description of the command to appear in the description line 546. A user may then edit the command and description using conventional text editing techniques, including entering new and additional commands using a keyboard. Pressing the "enter" key on the keyboard, or a similar identified command, updates the new command.

Alternatively, the user may select the command to edit by positioning a cursor over a graphical representation of the control buttons 94*a–f* and mode buttons 94*h–j* provided on the user interface, and highlighting the specific control button combination to be programmed. This causes the existing programmed commands associated with that combination of control button and mode button to appear in the command line 544, which my then be edited or added to by conventional text editing techniques.

Once entered, the associated command is then programmed such that when a user selects that combination of control button and mode button, the selected command is initiated in the application software. Also, the user interface display is updated to show the selected command in association with that selected control button and mode button combination as shown in step 408. Preferably, the lightable collar 99*a–f* of the selected programmable button 94*a–f* is illuminated to indicate that that button has been programmed.

Figure 16B:
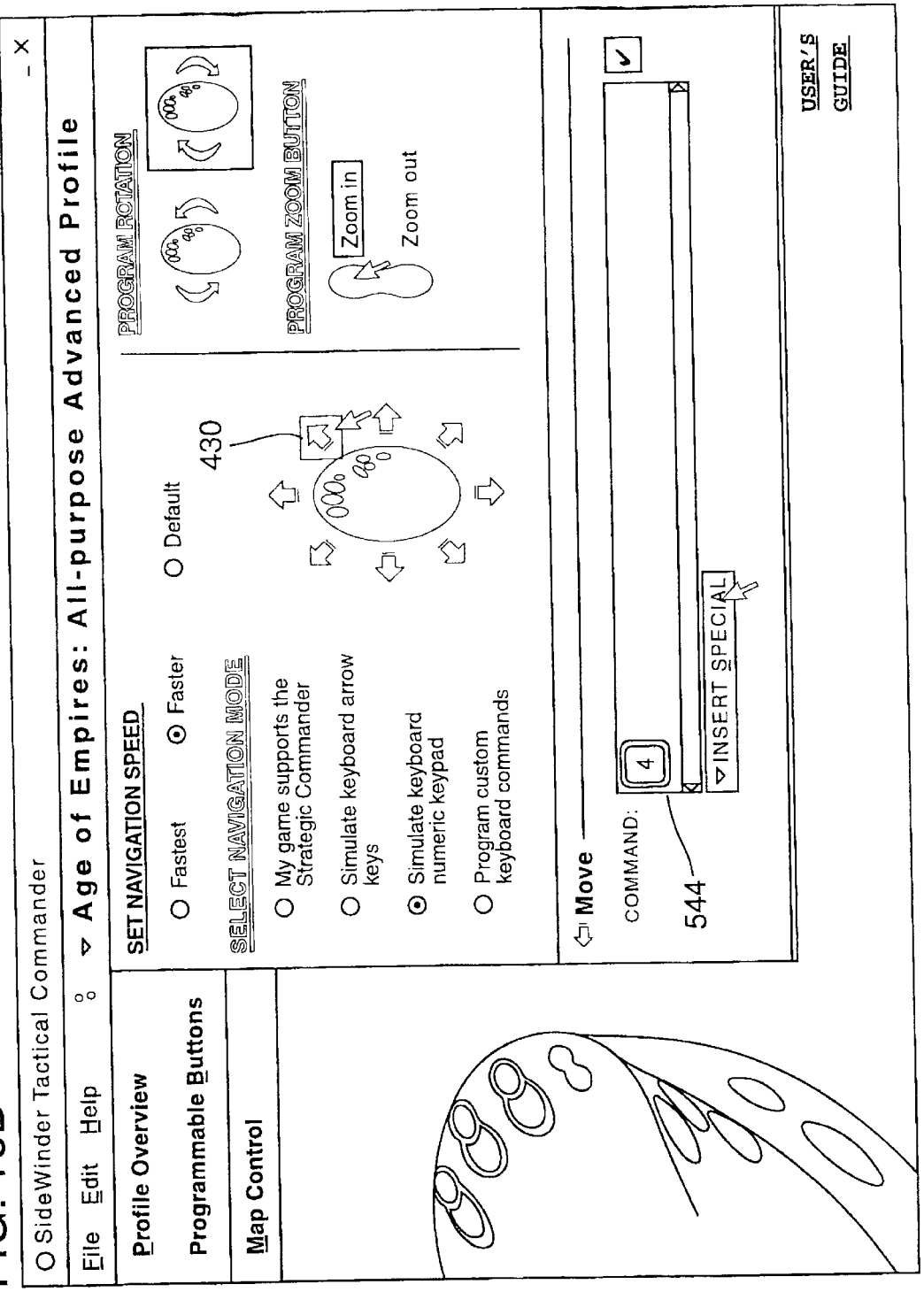
FIG. 16B is an exemplar user interface display illustrating a possible screen display associated with programming one of the directions of movement of the control device in accordance with a preferred embodiment of the present invention.

FIG. 16B shows an exemplar graphical user interface that permits the planar and rotational movements of the control device 20 to be programmed with different commands using the same method previously described. For example, movement of the pod in the direction of arrow 430 shown on the user interface could be programmed to enter the number 4 into the application software as shown in FIG. 16B.

In can be appreciated that all directions of movement of the pod can be programmed in a similar manner with different desired software application commands. For example, the keyboard commands for controlling the "camera" view in the game "POPULUS: THE BEGINNING", which are set forth in the background section, could be programmed by the user to correspond with selected intuitive physical movements of the pod. The command to move the camera view forward (the up arrow key) can be programmed to activate when the pod is moved forward from its neutral position in the direction of arrow 28 (FIG. 3). Similarly, the command to move the camera view to the left (left arrow key) can be programmed to activate when the pod is moved left in the direction of arrow 36 (FIG. 1). The zoom button 94*g* can be programmed to zoom in (+/= key) and zoom out (_/– key)

All available directions of movement for the "camera" view, can be programmed to activate based on physical movement of the pod. Accordingly, rather than forcing a user to stop and key-in the "camera" control commands, he or she may simply move the pod. For example, the user could command the camera view to "Scroll Forward," "Scroll Right," "Rotate Left," and "Zoom Out" simultaneously, simply by pushing the pod forward and to the right while rotating it left and pushing the "+" side of the zoom button 94*g*. Such programming, leaves the user free to use both the mouse and keyboard to enter other gaming commands.

Similarly, rather than requiring users to program these movement commands, software application designers can pre-program these commands to work in this manner, thereby saving the user time.

H. Operation of the Controller

A user operates the movable controller 20 by grasping the pod 22, preferably in his or her left hand (assuming the user is right-handed), such that it is fully supported with the palm, left thumb, and left hand fingers of the user engaging the corresponding palm, thumb, and finger engaging portions 236, 240, 238, respectively, of the pod. The user then moves the pod 22 along the defined plane 28 and twists the pod 22 as needed to control a particular computer application or the like. The user's left hand fingers and thumb are also aligned to activate the programmable control buttons 94*a–f*, zoom button 94*g*, and thumb-activated buttons 94*h–j* as needed without interfering with movement or the user's control of the pod 22.

Where the pod 22 movement has been programmed to control a "camera" or map view, and the "zoom" button 94*g* has been programmed to command that view to zoom in or out. The user's movement of the pod will correspond with intuitive movements of the camera or map view, without the need to enter view commands through either a mouse or keyboard. The programmed status of each pod movement may be determined by viewing the graphical user interface (FIG. 16B) displaying such command status.

In addition, having programmed the programmable buttons 94*a–f* of the control device 20 in accordance with one of the two methods set forth above, and determined their programmed status by viewing whether their lightable collars 99*a–f* are illuminated, the user simply presses the button to activate the programmed command while using an appropriate application software, such as playing a game. For example, the preferred commands for starting the game "AGE OF EMPIRES II THE AGE OF KINGS" set forth in the preceding background can be programmed into one of the programmable buttons 94*a–f* such as button 94*f*. Accordingly, when the user needs to execute that series of commands when starting a new game, he or she would simply press button 94*f*, rather than being forced to retype the entire series of commands.

Accordingly, it can be appreciated that the present invention allows the user to quickly and simultaneously enter map or camera view movement commands by moving the pod and related game commands by pressing the readily accessible programmed control buttons while keeping the mouse and keyboard free to enter other commands. As a result, games may be played more easily and quickly, because the need for the user to stop and key-in redundant information is reduced. Moreover, in some applications, the need for a user to enter any information through a mouse or keyboard is eliminated.

In view of the wide variety of embodiments to which the principles of the invention can be applied, it should be apparent that the detailed description of the invention is illustrative only and should not be taken as limiting the scope of the invention. For example, the desirable features of this invention have been discussed primarily in the context of improved gaming experiences. However, several aspects of the invention may also be used to improve use of traditional non-gaming software, such as using the programmable buttons to enter repetitive commands associated with data entry, word processing, and the like. Also, the control device is designed primarily to augment traditional keyboard and mouse. However, the device 20 can operate effectively without these other devices, and can even serve as the exclusive form of data input for some application software.

Figure 18:
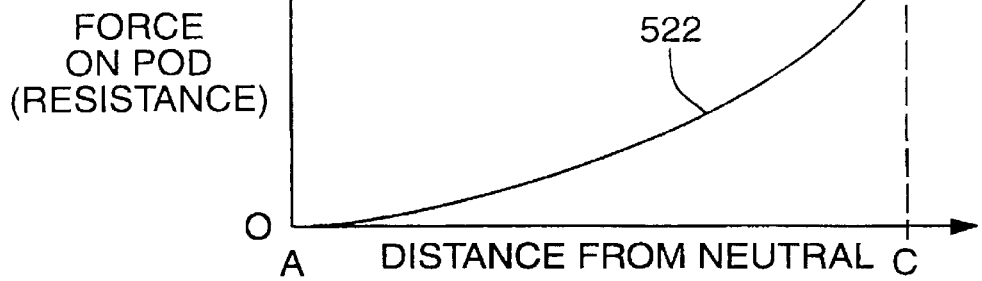
FIG. 18 is an exemplar relationship chart showing one possible proportional relationship between the return force acting on the controller urging it to return to its neutral position with the distance that controller is moved from its neutral position in accordance with a preferred embodiment of the present invention.

In addition, the curves 520, 522 of FIGS. 17 and 18 can have any shape as needed for a particular application or use, and the control parameter can be any software application command. Also, the sensors 58, 72, 74 and related command detection devices can be any type of sensors and related equipment used in the industry, including any type of transducer such as hall effect sensing devices, LDVT transducers and LED-based transducers and any type of motion sensor such as optical, magnetic and the like. Also, the size and shape of the pod can be readily modified to accommodate a right hand in a similar orientation to that described for a left hand.

Moreover, because the pod shaft 50 remains essentially perpendicular to the plane 28 of movement of the pod 22 throughout the pod's range of motion, without tilting like a joystick, a wide variety of contour surface shapes will provide desirable results. Accordingly, the claimed invention includes all such modifications as may come within the scope of the following claims and equivalents thereto.

What is claimed is:

1. A control device for a user to input commands into user application software, the device including:
   a pod movable with respect to a reference point in at least one direction defining a range of motion of the pod;
   a position detector configured to detect a position of the pod with respect to the reference point and to transmit the position to the user application software;
   a programmable input button secured to the pod;
   an indicator located proximal to and associated with the input button, wherein the indicator is configured to indicate a programmed status of the input button; and
   wherein the user can command at least two different aspects of the user application software by moving the pod and actuating the input button.

2. The control device of claim 1, wherein said indicator is a lightable element secured to the pod that illuminates when the input button has been programmed by the user.

3. The control device of claim 2, wherein said lightable element is a lightable portion of the input button.

4. A control device for a user to input commands into a user application software, the device including:
   a pod movable with respect to a reference point in at least one direction defining a range of motion of the pod;
   a position detector for detecting the position of said pod with respect to said reference point and transmitting the detected position to the application software for use as a first control command in the application software;
   at least one control button secured to said pod for sending a second control command to the application software; and
   an indicator for detecting the programmed status of said second control command; and wherein:
   a user can simultaneously command at least two different aspects of the user application software by simultaneously moving the pod and actuating the control button;
   said pod is movable in all directions along a defined plane, defining a forward-and-backward movement and a side-to-side movement of the pod;
   said position detector detects the forward-and-backward movement of said pod for use as the first control command;
   said position detector detects the side-to-side movement of said pod for use as a third control command in the application software;
   said second control command is programmable by the user; and
   said indicator is a lightable element secured to the pod that illuminates when said second control command has been programmed by the user.

5. The control device of claim 4, wherein said lightable element is a lightable portion of said at least one button.

6. The control device of claim 5, wherein said lightable portion is a lightable collar encircling said at least one button.

7. A control device for a user to input commands into user application software, the device including:
   a body;
   at least one control button secured to the body, said control button being programmable by the user with input commands for the user application software, such that activation of the button inputs the command to the user application software, defining a programmed mode of said control button; and
   an indicator for indicating said control button is in said programmed mode, wherein said body includes:
   a base;
   a pod operably secured to the base such that said pod is movable with respect to the base in at least one direction; and
   means for detecting the relative position of the pod with respect to the base and transmitting the relative position to a computer for use to input a control command to the application software.

8. The control device of claim 7, wherein said control command associated with the relative position of the pod is selected by the user defining a selected control command for a selected direction of movement of the pod, such that movement of the pod in the selected direction activates said selected control command.

9. The control device of claim 7, wherein said pod is movable in all directions along a plane defining at least two different directions of movement, each direction of movement used to input a control command to the application software.

10. The control device of claim 9, wherein each said control command is independently selectable by the user defining an associated control command for each direction of movement of said pod, such that movement of the pod in a selected direction activates said associated control command.

11. The control device of claim 7, wherein said pod is biased to a neutral position with respect to the base, and the distance said pod is moved from said neutral position serves as an input control command to the application software.

12. The control device of claim 11, wherein said input control command is proportional to the distance the pod is displaced from said neutral position.

13. A control device for a user to input commands into user application software, the device including:
   a pod movable with respect to a reference point in at least one direction along a defined plane and rotationally within the plane; and
   an input button secured to said pod; and
   wherein the user can command multiple aspects of the user application software by moving and rotating the pod and actuating the input button;

further including an indicator on the device configured to indicate a programmed status of the input button.

14. The control device of claim 13, wherein the pod is biased to a neutral position.

15. A method for controlling user application software with a controller that has an input button and is movable rotationally within and in at least one direction along a defined plane, comprising the steps of:

moving the controller along the plane, thereby sending a first control command to the user application software;

rotating the controller about an axis substantially perpendicular to the plane, thereby sending a second control command to the user application software;

actuating the input button, thereby sending a third control command to the user application software;

programming the controller; and indicating on the controller a programmed status of the input button.

16. A control device for a user to input commands into user application software, the device including:

a base;

a pod operably secured to the base such that the pod is movable with respect to the base in at least one direction along a plane, defining a first control parameter for the user application software;

a programmable input button secured to one of said base and said pod defining a second control parameter for the user application software; and an indicator located proximal to and associated with the input button, wherein the indicator is configured to indicate a programmed status of the input button; and, wherein a user can command said first and second control parameters by moving said pod in the at least one direction and actuating the input button.

17. The control device of claim 16, wherein said pod is movable in at least two different directions along the plane, defining a first and a second direction of movement for the pod, and wherein:

said first direction of movement defines said first control parameter, and said second direction of movement defines a third control parameter.

18. A control device for a user to input commands into user application software, the device including:

a body;

an input button secured to the body, said input button being programmable by the user with input commands for the user application software, such that activation of the button inputs the command to the user application software, defining a programmed mode of said input button; and an indicator located proximal to and associated with the input button for indicating that the button is in said programmed mode;

wherein said body includes:

a base;

a pod operably secured to the base such that said pod is movable with respect to the base in at least one direction; and a sensor configured to detect the relative position of the pod with respect to the base and to transmit the relative position to a computer for use as a control command for the user application software.

19. The control device of claim 18, wherein movement of the pod in a direction selected by a user activates said control command.

20. The control device of claim 18, wherein said pod is movable within a plane defining at least two different directions of movement, wherein each direction of movement inputs a separate control command to the user application software.

21. The control device of claim 20, wherein each said separate control command is independently selectable by the user.

22. The control device of claim 18, wherein said pod is biased to a neutral position with respect to the base, and the distance said pod is moved from said neutral position serves as an input control command to the user application software.

23. The control device of claim 22, wherein said input control command varies based upon the distance the pod is displaced from said neutral position.

24. The control device of claim 18, wherein the pod is biased to a neutral position with respect to the base.

25. The control device of claim 24, wherein the control command varies based upon the distance the pod is displaced from the neutral position.

* * * * *

UNITED STATES PATENT AND TRADEMARK OFFICE
CERTIFICATE OF CORRECTION

PATENT NO. : 6,717,569 B1
DATED : April 6, 2004
INVENTOR(S) : Robert Gruhl

Page 1 of 1

It is certified that error appears in the above-identified patent and that said Letters Patent is hereby corrected as shown below:

<u>Drawings,</u>
Sheet 12 of 13, FIG. 16A, block 544, delete " ☑ " and insert -- 4 --, therefor.
Sheet 13 of 13, FIG. 16B, block 544, delete " ☑ " and insert -- 4 --, therefor.

Signed and Sealed this

Seventh Day of June, 2005

JON W. DUDAS
*Director of the United States Patent and Trademark Office*